US006878755B2

(12) United States Patent
Singh et al.

(10) Patent No.: US 6,878,755 B2
(45) Date of Patent: Apr. 12, 2005

(54) AUTOMATED MICROFABRICATION-BASED BIODETECTOR

(75) Inventors: Angad Singh, San Antonio, TX (US); Shahzi S. Iqbal, San Antonio, TX (US)

(73) Assignee: Microgen Systems, Inc., Duluth, GA (US)

( * ) Notice: Subject to any disclaimer, the term of this patent is extended or adjusted under 35 U.S.C. 154(b) by 712 days.

(21) Appl. No.: 09/766,742

(22) Filed: Jan. 22, 2001

(65) Prior Publication Data

US 2003/0186218 A1 Oct. 2, 2003

(51) Int. Cl.[7] ............................ G01N 21/64; B01L 3/00

(52) U.S. Cl. .................... 522/100; 422/103; 422/82.05; 422/82.07; 422/82.08

(58) Field of Search ................................ 422/100, 103, 422/82.05, 82.07, 82.08; 436/172, 177, 180

(56) References Cited

U.S. PATENT DOCUMENTS

| | | | | |
|---|---|---|---|---|
| 5,922,591 A | * | 7/1999 | Anderson et al. | 435/287.2 |
| 5,948,684 A | | 9/1999 | Weigl et al. | |
| 5,955,028 A | * | 9/1999 | Chow | 422/63 |
| 6,048,734 A | | 4/2000 | Burns et al. | |
| 6,109,717 A | | 8/2000 | Kane et al. | |
| 6,109,889 A | | 8/2000 | Zengerle et al. | 417/413.2 |
| 6,146,103 A | * | 11/2000 | Lee et al. | 417/50 |
| 6,664,104 B2 | * | 12/2003 | Pourahmadi et al. | 435/288.6 |
| 6,692,697 B1 | * | 2/2004 | Melendez et al. | 422/57 |
| 6,699,384 B1 | * | 3/2004 | Lin et al. | 205/792 |

OTHER PUBLICATIONS

PCT Search Report for International Application No. PCT/US02/02005 filed Jan. 22, 2002.

Stehr, M. et al., "A New Micropump with Bioirectional Fluid Transport and SelfBlocking Effect", Proceedings of the 1996 IEEE Workshop on Microelectromechanical Systems (MEMS 96), San Diego, CA, pp. 485–490.

Iqbal, S.S. et al., "A Review of Molecular Recognition Technologies for Detection of Biological Threat Agents", Biosensors and Bioelectronics, 15 (ELSEVIER 2000), pp. 549–578.

Anderson R.C. et al., "Genetic Analysis Systems: Improvements and Methods", Solid–State Sensor and Actuator Workshop, Hilton Head Island, South Carolina, Jun. 8–11, 1998.

(Continued)

*Primary Examiner*—Jeffrey R. Snay
(74) *Attorney, Agent, or Firm*—Koestner Bertani LLP

(57) ABSTRACT

A system, apparatus, and method for processing a sample for chemical and/or biological analysis, and detecting one or more target substances. A first system of microfabricated components includes at least a reservoir and a channel, and a second system of detection components including at least a lens. The lens is focused on a sensing platform of the first system. The sensing platform is coupled to the reservoir by the channel. Various types of detection systems can be utilized with the present invention including fluorescence detection systems with a laser that is positioned to illuminate a sample in the sensing platform. The microfabricated components include one or more pumps, valves, mixers, and filters. A thermoelectric cooler can be positioned to control the temperature of at least one of the microfabricated components. A variety of component configurations can be implemented, and a variety of different processes can be performed, depending on the configuration of components. The device can also be networked with other information processing devices and share data regarding substances detected from the sample.

26 Claims, 19 Drawing Sheets

OTHER PUBLICATIONS

Woolley, Adam et al., "Functional Integration of PCR Amplification and Capillary Electrophoresis in a Microfabricated DNA Analysis Device", Analytical Chemistry, 1996, 68, 4081–4086.

Lagorce, Laure K. et al., "Magnetic Microactuators Based on Polymer Magnets", IEEE Journal of Microeletromechanical Systems, vol. 8, No. 1, Mar. 1999.

Stehr, M. et al., "The Selfpriming VAMP", Transducers '97, International Conference on Solid–State Sensors and Actuators (1997).

Forster, Fred K. et al., "Design, Fabrication and Testing of Fixed–Valve Micro–Pumps", FED–vol. 234, IMECE, Proceedings of the ASME Fluids Engineering Division, ASME 1995, pp. 39–44.

Jang, Ling–Sheng et al., "Transport of Particle–Laden Fluids Through Fixed–Valve Micropumps", ASME International Mechanical Engineering Congress & Exposition, Nov. 14–19, 1999.

Gerlach, Torsten, "Pumping Gases by a Silicon Micro Pump with Dynamic Passive Valves", International Conference on Solid–State Sensors and Actuators, Chicago, Jun. 16–19, 1997.

Evans, John D. et al., "The "Spring Valve" Mechanical Check Valve for In–Plane Fluid Control", Berkeley Sensor & Actuator Center, 497 Cory Hall, University of California, Berkeley.

Becker, Holger et al., "Polymer High Aspect Ratio Structures Fabricated with Hot Embossing", Jenoptik Mikrotechnik, Jena, Germany.

Alsson, Anders, "Valve–Less Diffuser Pumps for Liquids", Instrumentation Laboratory Department of Signals, Sensors and Systems Royal Institute of Technology, Stockholm, Sweden 1996.

* cited by examiner

BRIDGES
TEC_DIR
TEC_ON
COILDIR
COIL_ON
LASER
BRIDGES.SCH
VALVE CLOSE
J3
CONN14
74HC574
74HC32
74HC185
74HC04
74HC14
J11
CONN10
J4
CONN10
FROM DIGITAL OUT
BUZZER
BS170
GREEN
VALVES
J1
CONN30
GND

AUTOMATED MICROFABRICATION-BASED BIODETECTOR

CROSS-REFERENCE TO RELATED APPLICATIONS

This application is related to and incorporates by reference herein in their entirety the commonly owned and concurrently filed patent applications:

Ser. No. 09/766,740 entitled "MAGNETIC ACTUATION SCHEME FOR MICROPUMPS" by Angad Singh.

Ser. No. 09/767,009 entitled "ACTIVE DISPOSABLE MICROFLUIDIC SYSTEM WITH EXTERNALLY ACTUATED MICROPUMP" by Angad Singh and Shahzi S. Iqbal.

BACKGROUND OF THE INVENTION

Description of the Related Art

Advances in technology have made it possible to map DNA and protein sequences, gene expressions, cellular roles, protein families, and taxonomic data for microbes, plants and humans. Biochemical processes are used to separate molecules from a fluid sample and compare them to such data to detect abnormalities in these molecules. A baseline sample can also be compared against a subsequent sample from the same host to identify pathogens and the onset of disease. In the past, these diagnostic capabilities were provided by technicians in laboratories, and several days were often required to receive results of the tests.

Currently, capabilities exist to fabricate devices having dimensions on a micrometer scale. This is referred to as microfabrication. Multiple microfabricated components involved in processes for conducting biological and chemical analysis can be integrated onto a single microfluidic system 104 that fits in a handheld device. The components may include filters, valves, pumps, mixers, channels, reservoirs, and actuators. Biochemical analysis typically involves preparing a sample, adding reagents, further method-specific manipulations such as heating and cooling, and reading and interpreting raw data. Although state-of-the-art automated systems have mechanized, rather than eliminated, many of these steps, they have not been able to combine a number of different methodologies or technologies into a single system.

It is therefore desirable to provide a cost-effective bio-sensor that is capable of processing a sample from start to finish within a single instrument, without complicated intervention or processing by the operator. Further, it is desirable for the bio-sensor to be a hand-held, portable device that includes multiple microfabricated components a disposable microfluidic system 104 for performing a complete series of processes, as required, for biological and chemical analysis. Moreover, it is desirable for the bio-sensor to provide cost-effective, yet highly sensitive and accurate analytical capabilities that provide results in a relatively short period of time. Further, the bio-sensor should be configurable to perform a variety of different analytic processes. It is also desirable to provide capabilities for transferring information from the bio-sensor over an information network for access by other users.

SUMMARY OF THE INVENTION

The present invention provides a system, apparatus, and method for processing a sample for chemical and/or biological analysis, and detecting one or more target substances. A variety of component configurations can be implemented in a device in accordance with the present invention, and a variety of different processes can be performed, depending on the configuration of components. The device incorporates microfabricated components in a handheld device. The device can also be networked with other information processing devices and share data regarding substances detected from the sample.

In one embodiment, the apparatus includes a first system of microfabricated components including at least a reservoir and a channel, and a second system of detection components including at least a lens. The lens is focused on a region (hereinafter "sensing platform") of the first system. The sensing platform is coupled to the reservoir by the channel.

In one embodiment, the second system includes a fluorescence detection system. Various types of fluorescence detection systems can be utilized with the present invention including detection systems with a laser that is positioned to illuminate a sample in the sensing platform.

The microfabricated components include one or more pumps, such as a pump that is actuated electro-magnetically or piezoelectrically. The pumps can be used to transfer the sample from the reservoir to the sensing platform.

The microfabricated components also include one or more valves that control flow of the fluid between the reservoir and the sensing platform.

The microfabricated components also include one or more mixers that combine the sample with reagents or wash solutions. One embodiment of a mixer includes a nozzle that is positioned to inject a substance into the reservoir.

The microfabricated components can also include one or more filters for extracting the target substance from the sample.

Another feature that can be included in the apparatus is a thermoelectric cooler that is positioned to control the temperature of at least one of the microfabricated components. This feature can be used to heat and cool the sample during processing.

Another feature of the apparatus is one or more driver units that are coupled to provide control signals to at least one of the microfabricated components, such as the pumps and the heater, as well as one or more of the detection components, such as the laser.

Another feature of the apparatus is that the first system can be disposed of after processing a sample, and a new first system can be used for the next sample to be processed. This has the advantage of reducing the risk of contaminating the sample.

In one embodiment, the microfabricated components can be etched in a silicon substrate.

In another embodiment, the microfabricated components are formed in a polymer substrate.

In another embodiment, a biosensor system for processing a sample and detecting one or more target substances in the sample includes data processing and control unit, a microfluidic system coupled to communicate with the data processing and control unit, and a detection system coupled to receive a processed sample from the microfluidic system. The detection system also transmits signals regarding the target substances to the data processing and control unit. A handheld housing houses the data processing and control unit, the microfluidic system, and the detection system.

One feature of the system is a user interface coupled to receive input from a user and provide output to the user. The user interface is also coupled to provide the input from the user to the data processing and control unit. The system can be used to process and detect more than one type of substance, and the user can input information regarding the processes to be performed and the target substances to be detected.

Another feature of the system is that the data processing and control unit can process information from the detection system to provide the user with an analysis of the substance (s) detected.

Another feature of the system is one or more driver units in the data processing and control unit that control operation of the components in the microfluidic system and/or the detection system.

In another embodiment, a method for purifying and detecting one or more target substances in a sample using a handheld biosensor system includes processing the sample using microfabricated components in the biosensor system, transferring the processed sample to a sensing platform in the biosensor system; and detecting the one or more target substances on the sensing platform using a detection system in the biosensor system.

The method can include concentrating, filtering, heating, cooling, washing, and mixing the sample with other substances.

A variety of substances can be detected, depending on the processes implemented. Such substances include toxins, bacteria, viruses, as well as genetic characteristics.

The foregoing has outlined rather broadly the features and technical advantages of the present invention so that the detailed description of the invention that follows may be better understood.

BRIEF DESCRIPTION OF THE DRAWINGS

FIGS. 1*aa*–1*aw* are schematic diagrams of circuits included in a biosensor system in accordance with an embodiment of the present invention.

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
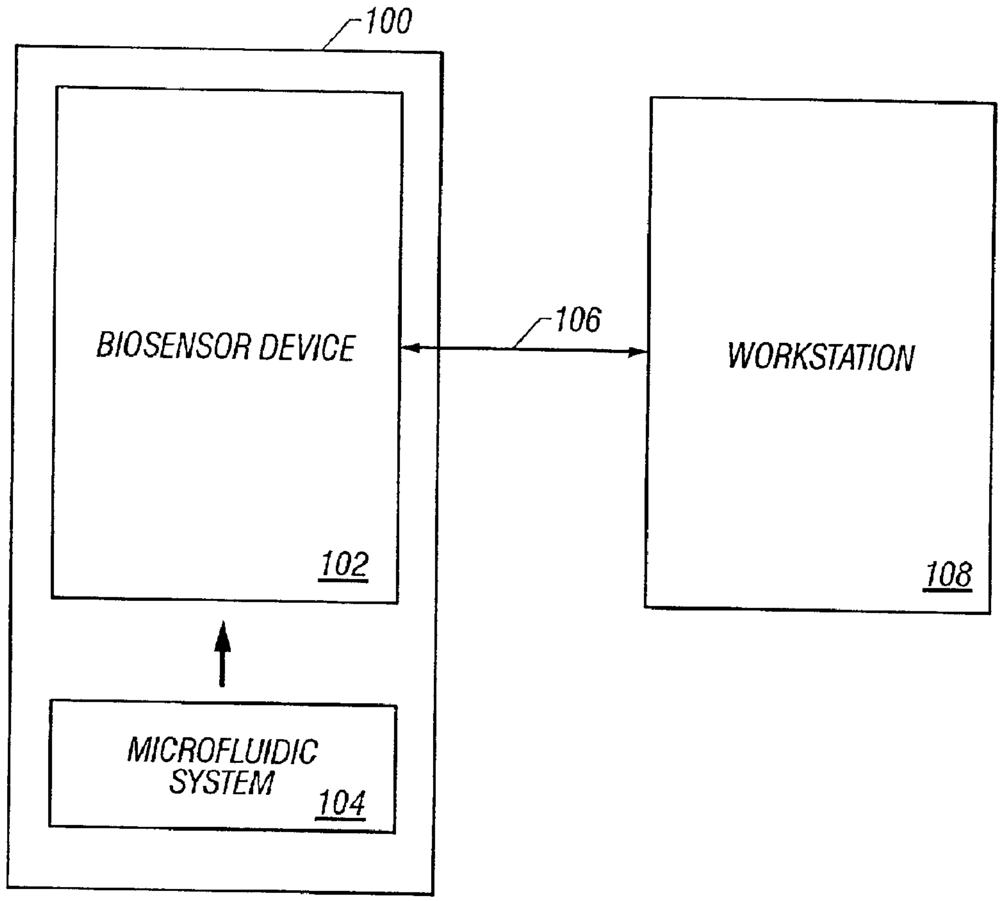
FIG. 1 is a block diagram of components included in an embodiment of a bio-sensor system in accordance with the present invention.

Referring to FIG. 1, biosensor system 100 is shown including biosensor device 102, microfluidic system 104, and network interface 106 to workstation 108. In one embodiment, microfluidic system 104 incorporates components that are required for performing chemical and/or biological processes on a sample of a substance to be analyzed. Microfluidic system 104 can be inserted and removed from biosensor device 102. Biosensor device 102 is a portable, hand-held unit that includes a user interface and display, an interface to microfluidic system 104, and an network interface 106 to one or more workstations 108 that allows a user at workstation 108 to access data collected using biosensor system 100. Biosensor system 100 can also be used as a workstation 108.

Figure 1A:
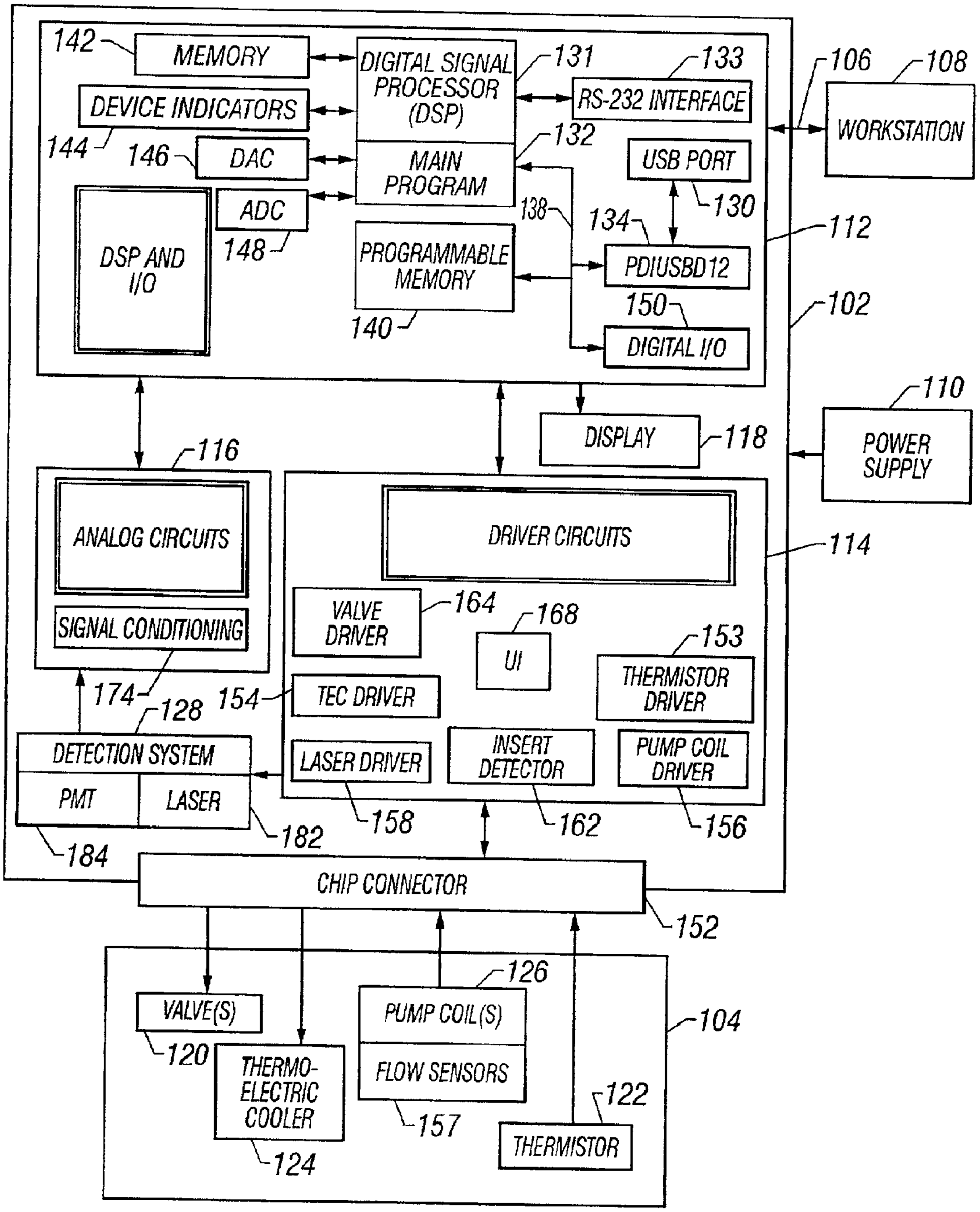
FIG. 1*a* is a block diagram of components included in an embodiment of a bio-sensor device in accordance with the present invention.
Figure 1A:
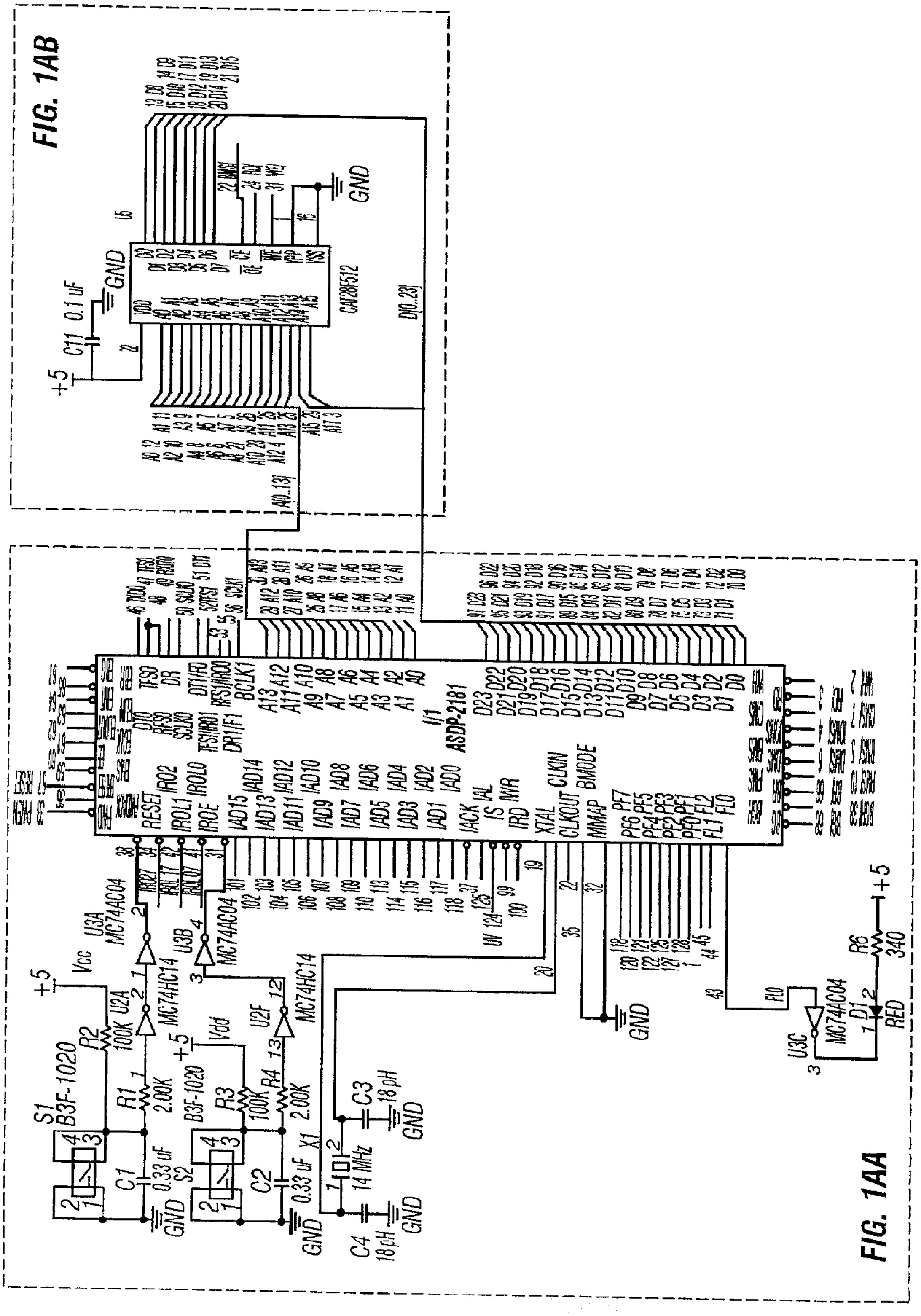
Figure 1A:
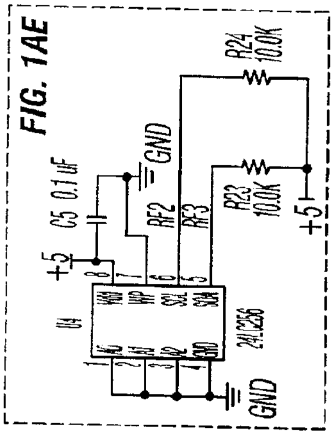
Figure 1A:
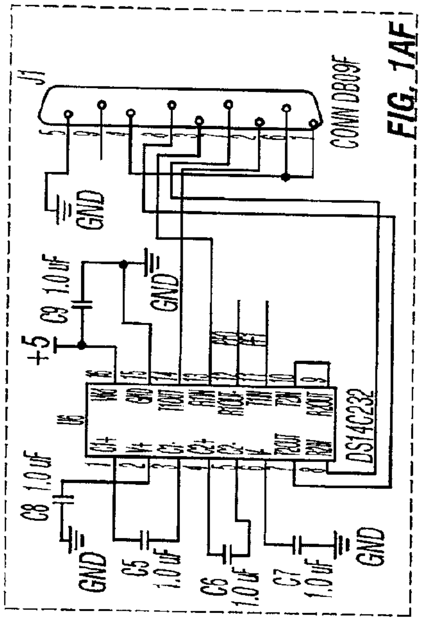
Figure 1A:
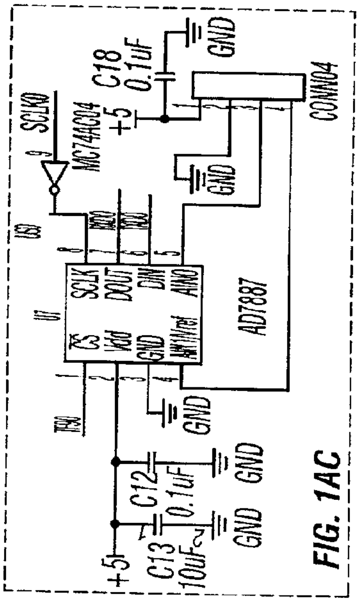
Figure 1A:
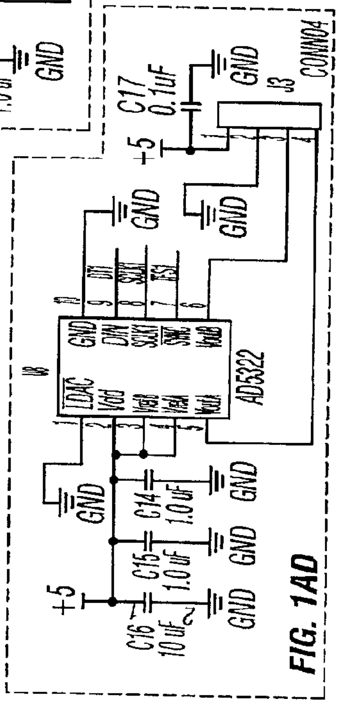
Figure 1A:
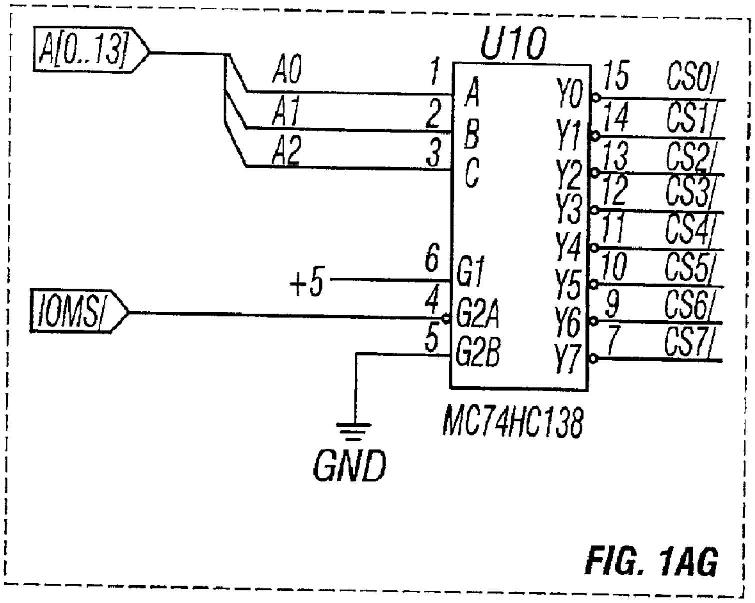
Figure 1A:
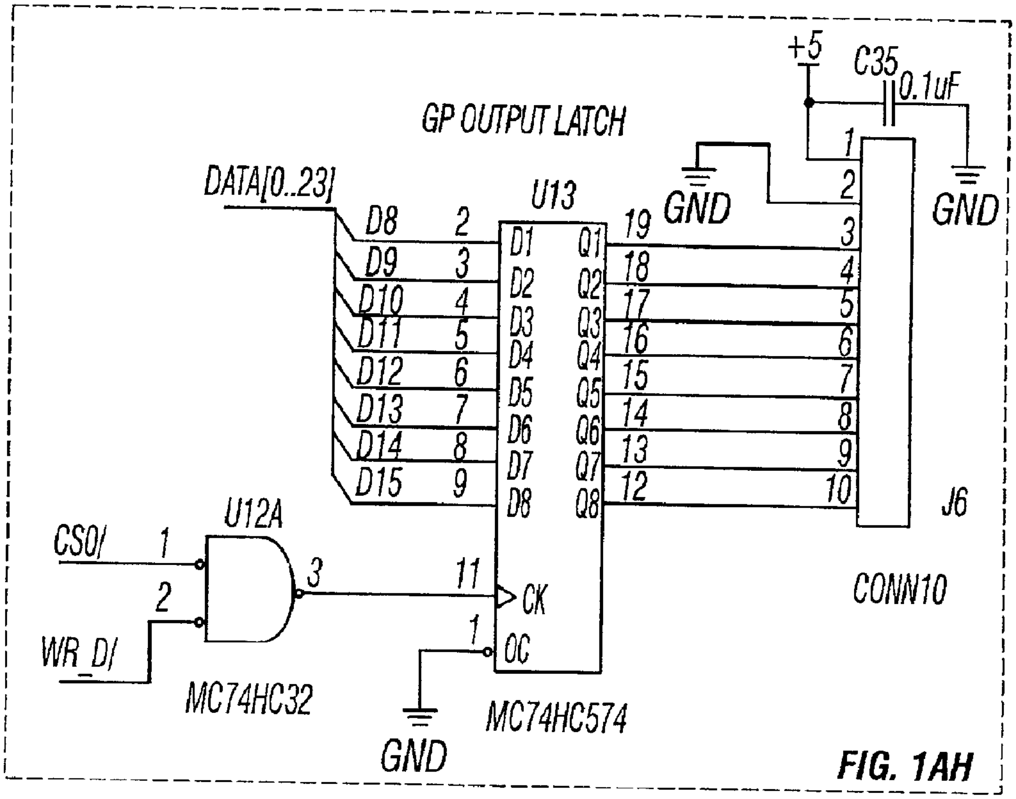
Figure 1A:
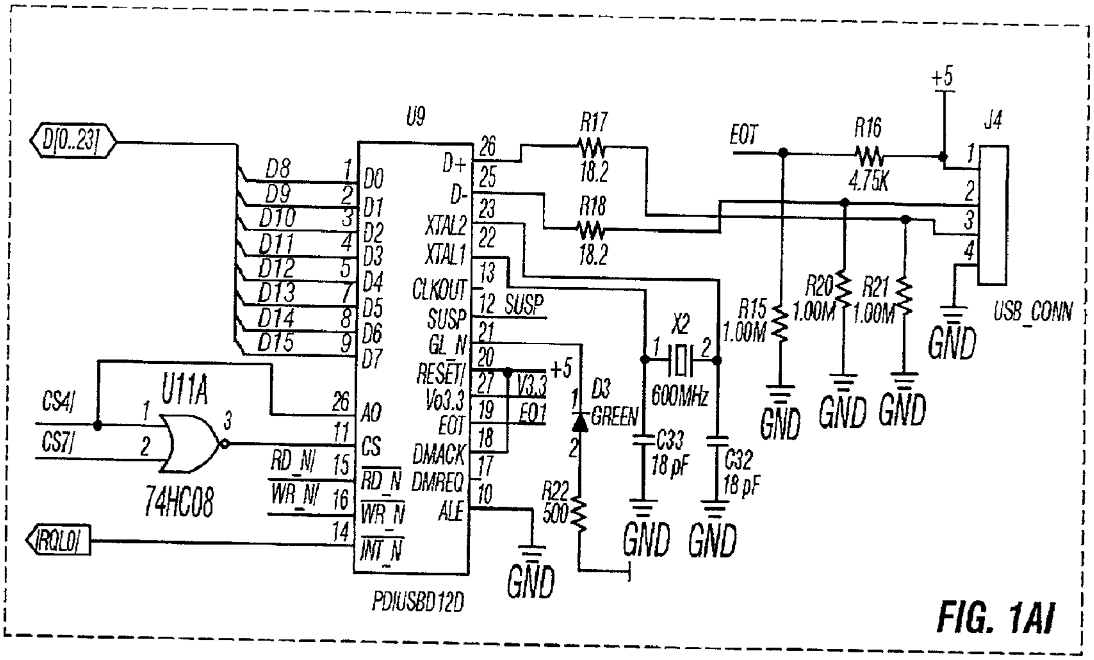
Figure 1A:
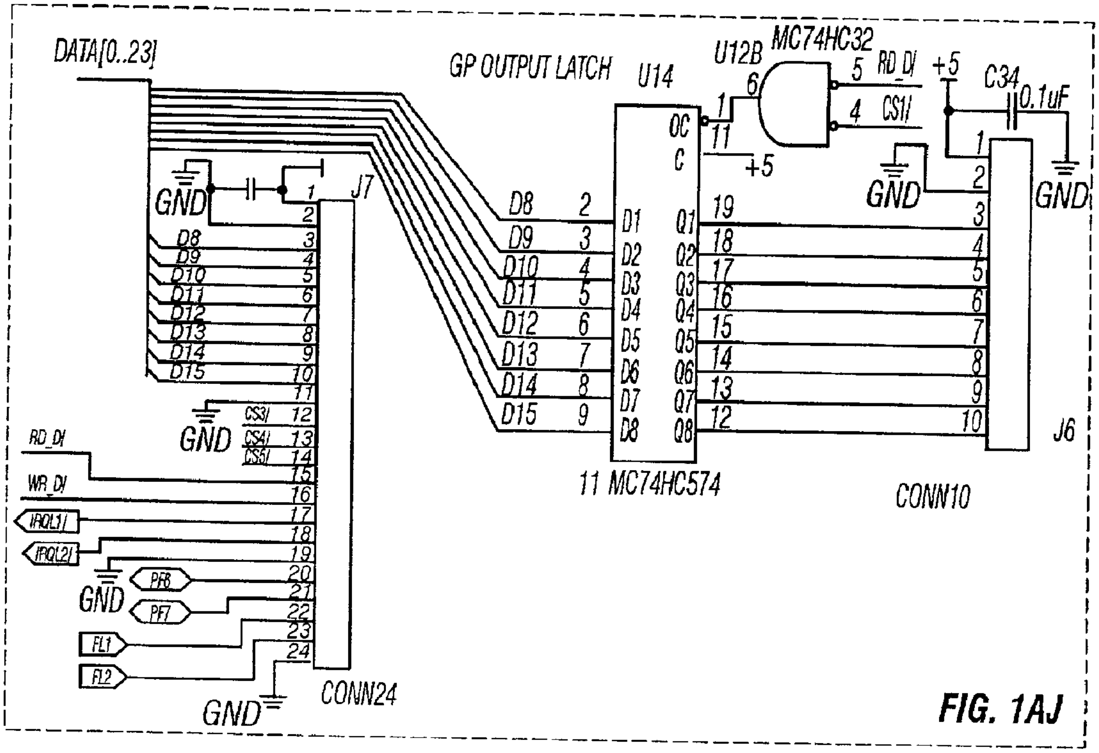
Figure 1A:
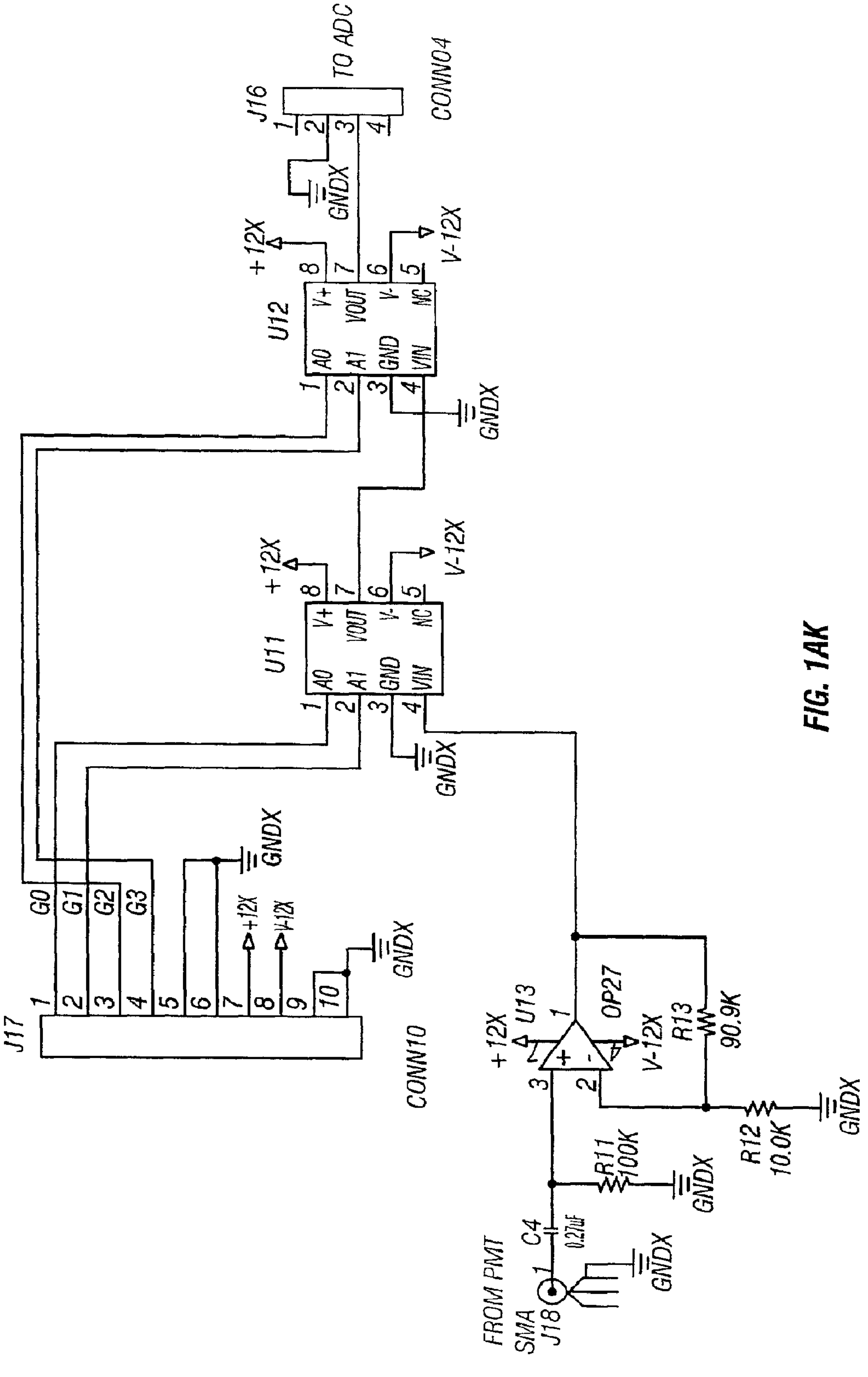
Figure 1A:
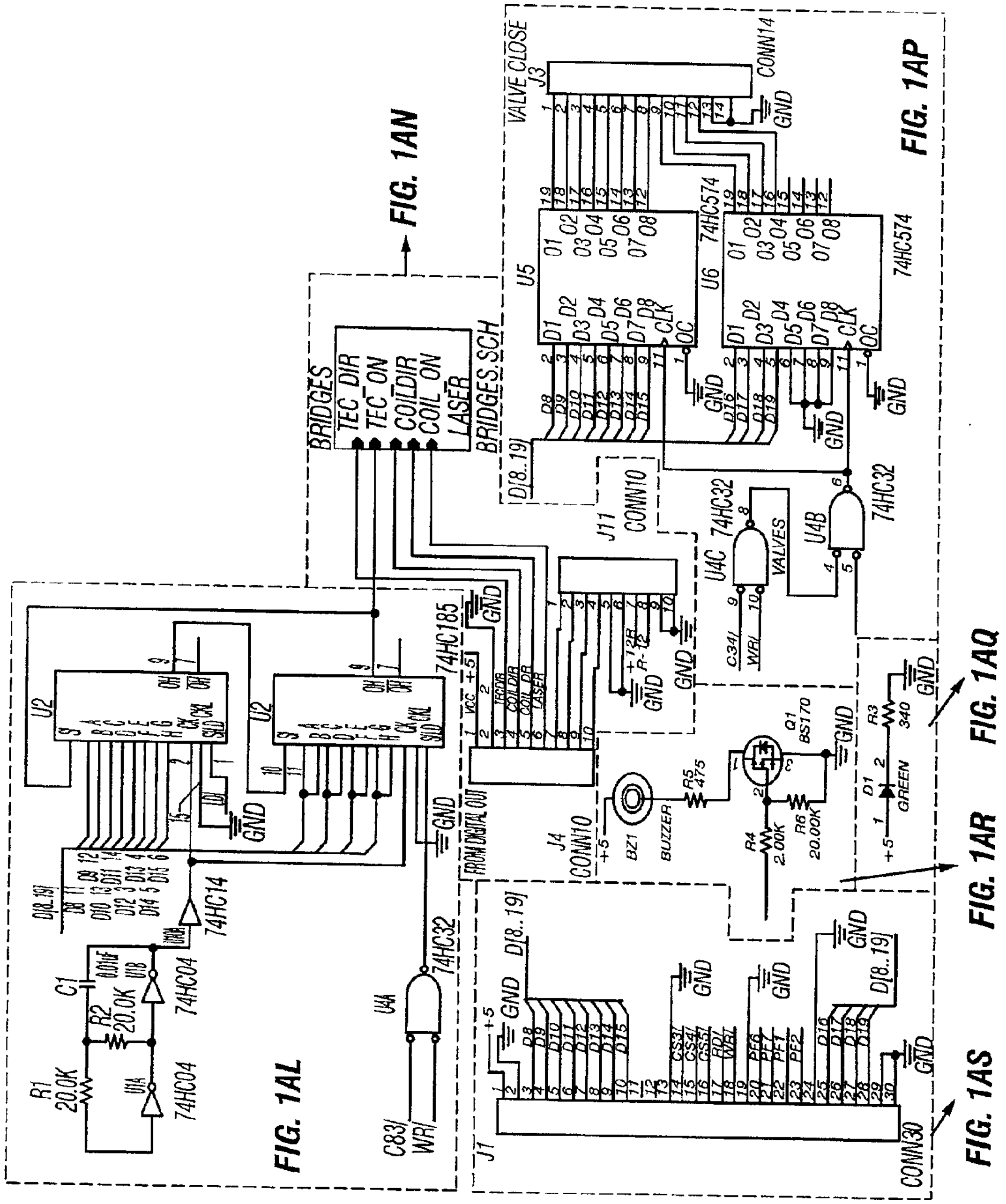
Figure 1A:
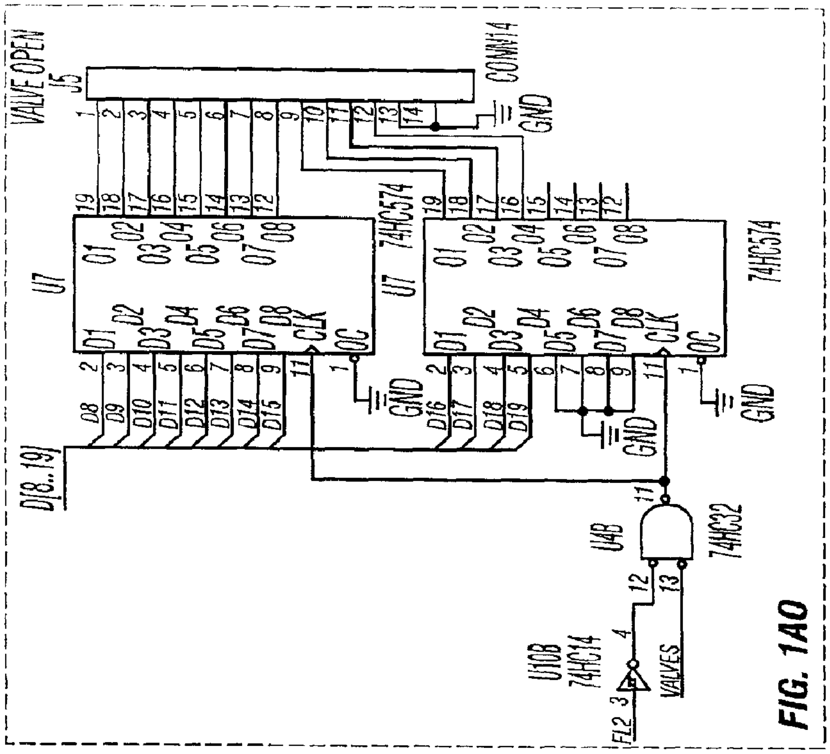
Figure 1A:
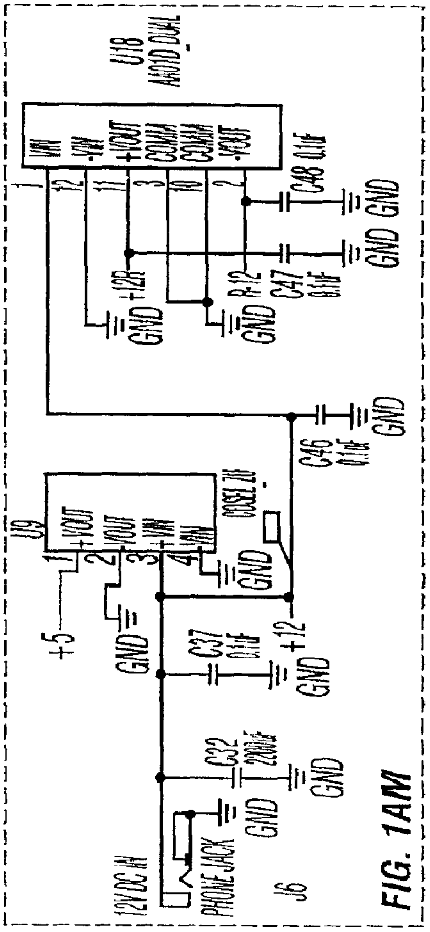
Figure 1A:
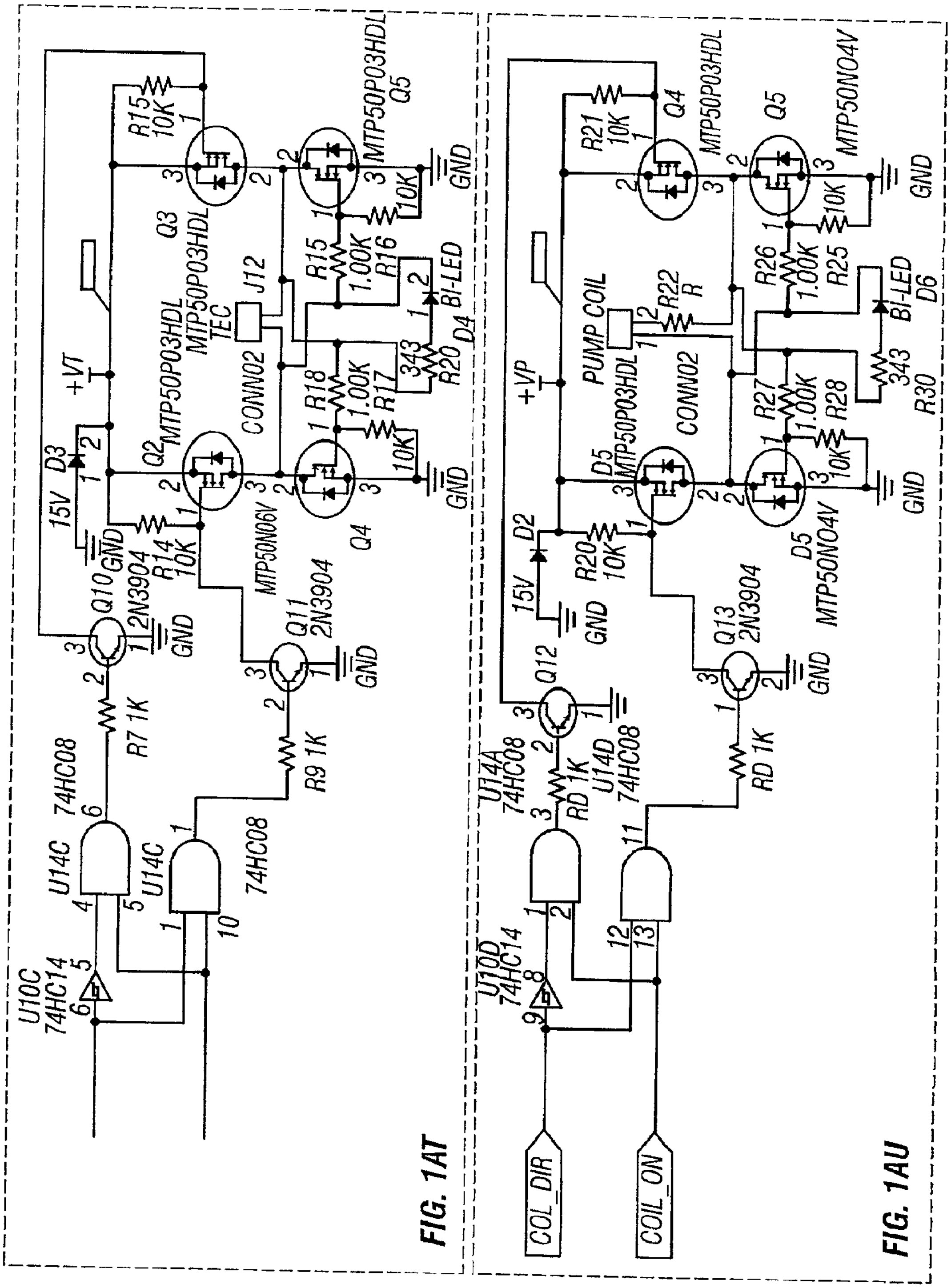
Figure 1A:
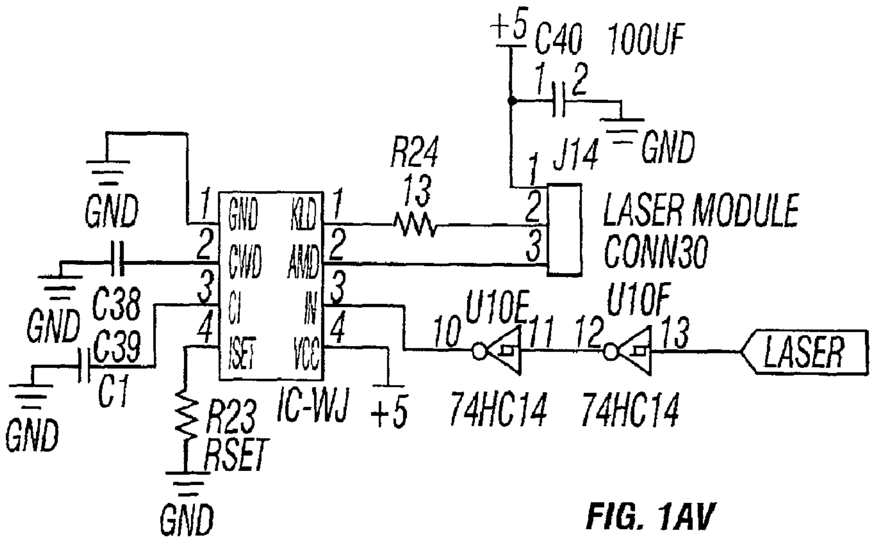
Figure 1A:
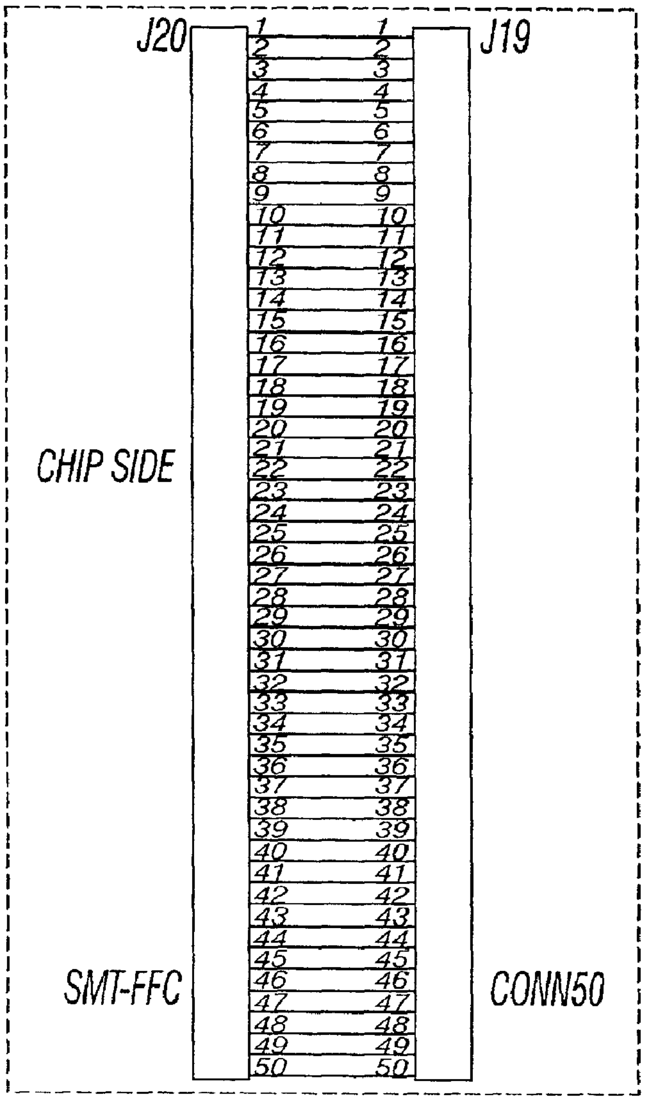

Referring now to FIGS. 1 and 1*a*, a block diagram of one embodiment of biosensor device 102 is shown in FIG. 1*a*. Power supply 110 provides operating power to various components on biosensor device 102 including digital signal (DSP) and input/output (I/O) processor 112, driver circuits 114, analog circuits 116, a display 118, valves 120, thermistor 122, thermoelectric cooler 124, pump coils 126, and detection system 128. Power supply 110 can be one or more commercially available power supplies, such as an internal DC battery or a power regulator that interfaces to an external AC supply. Power supply 110 is capable of providing one or more operating voltages at the levels required by the components of biosensor device 102. Biosensor device 102 can also be powered via a universal serial bus (USB) port 130 with the workstation 108.

In the embodiment shown in FIG. 1*a*, data processing functions are divided among DSP and input/output (I/O) processor 112, driver circuits 114, and analog circuits 116. It is important to note, however, that data processing functions can be distributed using additional or fewer processors than shown in FIG. 1*a*. FIGS. 1*aa* through 1*aj* are schematic diagrams showing examples of interface circuits between DSP 131 and components in DSP and I/O processor 112. FIG. 1*ab* shows an example of an interface to programmable memory 140 for storing DSP program instructions. FIG. 1*ac* shows an example of an interface to Analog to Digital converter ADC 148 which converts analog voltage level (e.g., temperature & fluorescence level) to a digital signal which can be used by the DSP. FIG. 1*ad* shows an example of an interface to digital to analog signal converter DAC 146 which provides analog output voltage. FIG. 1*ae* shows an example of an interface to memory 142 for non-volatile memory storage. FIG. 1*af* shows an example of an interface to RS-232 serial interface 133. FIG. 1*ag* shows an example of an interface to device indicators 144. FIGS. 1*ah* and 1*aj* show examples of an interface to digital I/O 150, which also interfaces with the driver circuits 114. FIG. 1*ai* shows an example of an interface to USB port 130.

FIG. 1*ak* is an example of a schematic on analog circuits board 116 of a programmable amplifier that can be used to amplify the signal from the photo-multiplier-tube (PMT) 184.

FIGS. 1*al* through 1*aw* show examples of schematics for driver circuits 114. FIG. 1*al* shows an example of a programmable duty cycle generator for controlling the amount of power to TEC 124. FIG. 1*am* shows an example of a DC to DC converter which conditions power supply voltage. For example, the circuit in FIG. 1*am* converts a +12 volt (V) supply voltage to +5V, +12V and regulated +12V. FIG. 1*an* shows an example of an interface between DSP and I/O circuits 112, analog circuits 116, and driver circuits 114.

FIGS. 1*ao* and 1*ap* show examples of circuits which provide a set of digital control output signals for opening and closing, respectively, valves 120. FIG. 1*aq* shows an example of a light emitting diode to indicate when power to the system 100 (FIG. 1) is turned ON. FIG. 1*ar* shows an example of a circuit for a piezoelectric buzzer for chip insert detection or user input detection. FIG. 1 shows an example of an interface connector for connecting DSP 131 to other components in DSP and I/O processor 112.

Biosensor system 100 also includes bridge circuits, examples of which are shown in schematics in FIGS. 1*at* through 1*aw*. FIG. 1*at* is an example of circuit for controlling TEC 124 (FIG. 1*a*). FIG. 1*au* is a bridge circuit used for controlling the current through the pump coil(s) 126 (FIG. 1*a*). FIG. 1*av* is a laser diode driver circuit which maintains a constant light output from the laser 182 (FIG. 1*a*) by regulating the current to the laser. FIG. 1*aw* is an example of a connector 152 which can be used to interface the microfluidic system 104 to biosensor device 102.

Examples of commercially available components which are suitable for use in the circuits shown in FIGS. 1*aa* through 1*aw* are as follows: FIG. 1*aa*: DSP chip ADSP-2181, part #ADSP-2181KS-115 by Analog Devices, Norwood, Mass.; FIG. 1*ab*: EEPROM (memory) chip, part #CAT28F512 by Catalyst Semiconductor, Sunnyvale, Calif.; FIG. 1*ac*: Analog-to-digital converter chip, part #AD7887 by Analog Devices, Norwood, Mass.; FIG. 1*ad*: Digital-to-analog converter chip, part #AD5322 by Analog Devices, Norwood, Mass.; FIG. 1*ae*: EEPROM (memory) chip, part #24LC256 by Microchip Technology, Farmington Hills, Mich.; FIG. 1*af*: RS-232 chip, part #DS14C232 by Dallas Semiconductor, Dallas, Tex.; FIG. 1*ag*: demultiplexer chip, part #MC74HC138 by ON Semiconductor, Phoenix, Ariz.; FIG. 1*ah*: Digital output gates and flip-flop chips, part #s MC74HC32 and MC74HC574 by ON Semiconductor, Phoenix, Ariz.; FIG. 1*ai*: USB interface chip, part #PDIUSBD12D by Phillip Semiconductor, Sunnyvale, Calif., and gate 74HC08 by ON Semiconductor, Phoenix, Ariz.; FIG. 1*aj*: flip-flop and gate chips, part #s MC74HC573 and MC74HC32 respectively by ON Semiconductor, Phoenix, Ariz.; FIG. 1*ak*: Programmable gain amplifier chips, part #PGA103 by Burr-Brown Corporation/Texas Instruments, Dallas, Tex., and operational amplifier OP27 by Analog Devices, Norwood, Mass.; FIG. 1*al*: Shift registers, part #74HC165 by ON Semiconductor, inverters, part #74HC14 and #74HC04 by ON Semiconductor, Phoenix, Ariz.; FIG. 1*am*: DC-DC converter chips COSEL_ZU, part #ZUS 1R5 1205 by Cosel USA, San Jose, Calif. and AA01D_DUAL, part #AA01D-012L-120D by Astec America, Carlsbad, Calif.; FIG. 1*ao*: Flip-flop, part #74HC574 by ON Semiconductor, and gate 74HC32 also by ON Semiconductor, Phoenix, Ariz.; FIG. 1*ap*: Same as FIG. 1*ao*; FIG. 1*at*: Gates, part #74HC14 and part #74HC08 by ON Semiconductor, Phoenix, Ariz.; FIG. 1*au*: Same as FIG. 1*at*; FIG. 1*av*: inverters, part #74HC14 by ON Semiconductor, and laser diode driver, part #iC-WJ by iC-Haus, Bodenheim, Germany.

Microfluidic system 104 includes microfabricated components for performing biological and chemical analysis. Such components can include, for example, filters, valves, pumps, mixers, channels, reservoirs, and actuators. Detection system 128 is used to detect target molecules that are the subject of the assay(s) that are performed using microfluidic system 104. One such detection system 128 includes an infrared (IR) laser and detector which is used to illuminate and detect IR dye, respectively, known as deoxynucleotide triphosphates (dNTPs) that can be used in the assays performed by microfluidic system 104. Other suitable detection systems can be implemented with microfluidic system 104 in addition to, or instead of, an IR detection system. Detection system 128, and microfluidic system 104 are discussed more fully hereinbelow.

In one embodiment, microfluidic system 104 is disposable and can be inserted and removed from biosensor device 102 as required. This allows a new microfluidic system 104 to be used for each new sample to be analyzed, thereby reducing the risk of contamination from previous samples.

DSP and I/O processor 112 includes a digital signal processor 131 for digital signal processing along with main program instructions 132 that control execution of components included in processor 112. Main program instructions 132 also control communication with components external to processor 112. In one embodiment, digital signal processor 131 is a single-microfluidic system 104 microcomputer optimized for digital signal processing (DSP) and other high speed numeric processing applications. Digital signal processor 131 includes one or more serial data interfaces such as RS2-32 interface 133 and Universal Serial Bus (USB) interface 130. A peripheral device interconnect USB 134 shown, for example, as PDIUSBD12, allows conventional peripherals to be upgraded to USB devices and take advantage of the "hot plug and play" capability of the USB, as known in the art. The USB 134 interfaces with most device class specifications such as imaging, mass storage, communications, printing and human interface devices. USB 134 communicates with digital signal processor 131 using a high-speed, general-purpose parallel interface 138. Other data interfaces can be included in addition to or instead of interfaces 133 and 134.

Digital signal processor 131 also interfaces with other devices well-known in the art, including program and data memory 140, 142 for storing data and executing program instructions, device indicators 144, such as switches and lights, digital to analog (DAC) and analog to digital (ADC) converters 146, 148, and digital I/O controller 150. Digital signal processor 131 can also include a programmable timer and interrupt capabilities, as known in the art. Power-down circuitry can also be provided to conserve power when operating biosensor device 102. One example of a microprocessor currently available that is suitable for use with present invention is model number ADSP-2181 manufactured by Analog Devices, Inc. in Norwood, Mass.

Driver circuits 114 interface with microfluidics system 104 via connector 152 to communicate with valves 120, thermistor 122, thermoelectric cooler (TEC) 124, pumps 126. Driver circuits 114 also interface with detection system 128 in biosensor device 102. Connector 152 can be one of several connectors that are well known in the art and commercially available. One such connector is part #FH12-50S-0.5SH by Hirose Electric Co. Ltd.

Driver circuits include thermistor driver 153 and TEC driver 154 which generate signals to control the operation of thermistor 122 and TEC 124, respectively. Pump driver 156 includes logic to determine voltage signals required to operate pumps 126. The signals input to microfluidic system 104 to drive pumps 126 can be based on information provided by flow sensors 157 microfluidic system 104, wherein the sensors 157 indicate the amount or rate of flow of a substance through one or more pumps 126. Laser driver 158 generates signals to control operation of a laser in detection system 128. Such a laser is used for fluorescence detection, as further discussed hereinbelow.

Insert detector 162 receives information from microfluidic system 104 that indicates when microfluidic system 104 is inserted in biosensor device 102. When microfluidic system 104 is inserted in biosensor device 102, processors 112, 114, and 116 use the signal to begin operating other components in biosensor device 102.

Valve driver 164 sends signals to open and close valves 120 microfluidic system 104. A variety of valve and pump configurations can be implemented in microfluidic system 104, depending on the processes to be performed. The processes typically occur in a particular sequence, and can also be timed. Thus, valve driver 164 includes instructions for opening and closing each valve in microfluidic system 104 for respective processes and reactions. Valve driver 164, pump coil driver 156, thermistor driver 153, TEC driver 154, and laser driver 158, can also share information to determine which functions to perform at the appropriate time.

User interface (UI) module 168 provides information and/or options to a user that is presented on display 118 and via device indicators 144. UI module 168 also receives input from one or more of a variety of known user input devices such as a keyboard, mouse, light pen, audio commands, or other data input device known in the art. It is important to note that a variety of suitable user input devices and displays, including audio, visual, and tactile input/output devices, are known in the art and can be incorporated with the present invention. The foregoing examples are not intended to limit the present invention to any particular input or display device, or combination of devices.

Detection system 128 generates data signals representing the substances detected microfluidic system 104, and the data signals are input to analog circuits module 116. Analog circuits module 116 includes appropriate signal conditioning components 174, as required, such as a sample and hold circuit, filter(s), and/or an amplifier(s). The output from analog circuits module 116 is input to an analog to digital (A/D) converter 148 in DSP and I/O processor 112 for conversion from analog to digital form. This digital data can be further processed in DSP and I/O processor 112, and the results output to display 118 and/or network interface 106.

A variety of processes are required to perform different biological and chemical assays. For example, detecting a particular biological or chemical agent in a sample can include distilling and purifying a sample, heating the sample, mixing the sample with various reactants, and filtering the treated sample to isolate the target agent. Biosensor device 102 provides signals to actuate valves, pumps, and mixers to control the flow and mixing of the sample and various reactants to and from reservoirs in microfluidic system 104. Biosensor device 102 also provides control signals to thermistor driver 153 and TEC driver 154, which in turn provide signals to control operation of thermistor 122 and TEC 124, respectively, during processes such as DNA/protein denaturation, single strand DNA annealing, and primer extension. Biosensor system 102 can be programmed to perform a variety of assays that are performed automatically, or when selected by a user through UI module 168.

DSP and I/O processor 112, driver circuits 114, and analog circuits 116 in biosensor device 102 can be implemented using a combination of hardware circuits, software, and firmware, as known in the art.

One application of biosensor device 102 is automating PCR analysis. Nano-scale devices for automating PCR and post-PCR analysis are available in the prior art, however, sample preparation including DNA/RNA isolation, and detection by PCR are still carried out manually as two different processes. Therefore, to fully exploit the potential of PCR-based detection, biosensor device 102 advantageously integrates sample preparation, target amplification, and fluorescence detection into a single, portable, cost-effective device. Biosensor device 102 can also be used for biological and chemical analysis processes in addition to, or instead of, PCR-based analysis.

Referring now to FIGS. 1, 1*a*, 1*b*, and 1*c*, FIGS. 1*b* and 1*c* show a top view and side cross-sectional view of components of biosensor system 100 with microfluidics system 104 inserted into the biosensor device 102. Electronic circuit cards 180 control the operation of the optics in biosensor system 100, including laser diode source 182 and photomultiplier tube (PMT) 184. In an alternate implementation, any other light source, such as a blue LED, can be used instead of, or in addition to, laser diode source 182. Photodiode(s), or any other photo or electrical signal detection system, can be used, instead of, or in addition to, photomultiplier tube 184 for fluorescence detection and/or measurement. Electronic circuit cards 180 also include DSP and I/O processor 112, driver circuits 114, and analog circuits 116.

Figure 1B:
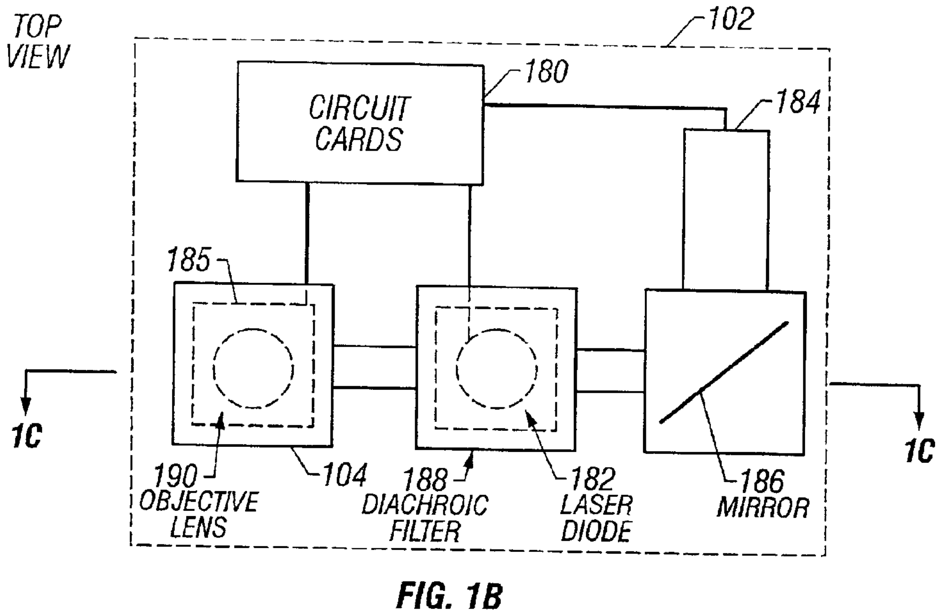
FIG. 1*b* is a top view of components included in an embodiment of a bio-sensor device in accordance with the present invention.
Figure 1C:
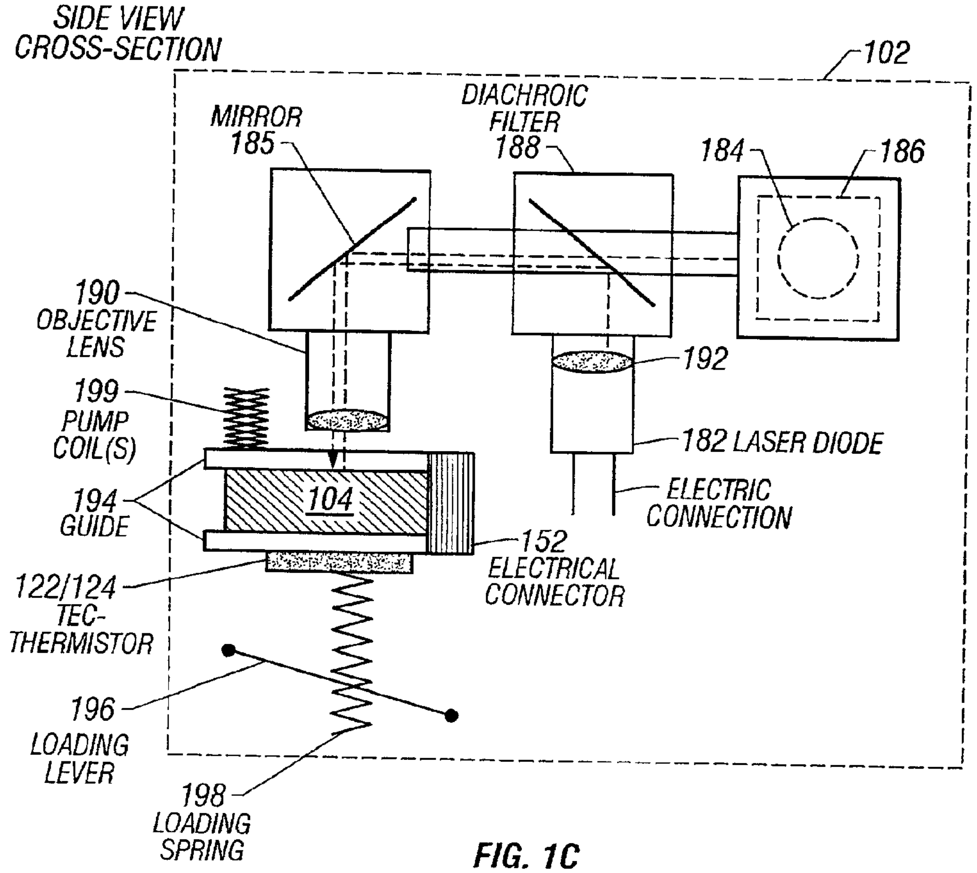
FIG. 1*c* is a side cross-section view of components included in an embodiment of a bio-sensor device in accordance with the present invention.

There are a variety of different detection systems 106 that can be implemented in biosensor device 102. One such detection system 128 that can be implemented in biosensor 100 is shown in FIGS. 1*b* and 1*c*. Detection system 128 includes optical components such as mirrors 185, 186, diachroic filter 188, and objective lenses 190, 192. Incident light beams (excitation) from laser diode 182 pass through a diachroic filter 188 and are directed at a specific wavelength via a mirror 185 and an objective lens 190 in respective order, to the detection area on the microfluidic system 104. Reflected (emitted) light beams from the detection area on the microfluidic system 104 are directed via the objective lens 190, mirror 185, diachroic filter 188 and mirror 186 at a specific wavelength, in respective order, to the detector 184, i.e., photomultiplier tube/photodiode. Emitted fluorescence (reflected light) is sensed by the detector 184, i.e., photomultiplier tube/photodiode. Detector 184 generates data signals representing the emitted (reflected) light and the data signals are input to analog circuits 116 (FIG. 1) for signal conditioning and conversion from analog to digital signals.

Microfluidic system 104 is inserted into biosensor device 102 and is guided to the appropriate position by one or more guide members 194 which slides the microfluidic system 104 into position to connect electrical connector 152. Following insertion of microfluidic system 104, loading lever 196 is released to allow spring member 198 to place TEC 124 in contact with microfluidic system 104. Additionally, electromagnetic pump coils 199 are positioned adjacent to the top side of the microfluidic system 104. One or more of these coils 199 can also be positioned on adjacent other sides of microfluidic system 104 to actuate pump(s) 126.

Figure 2:
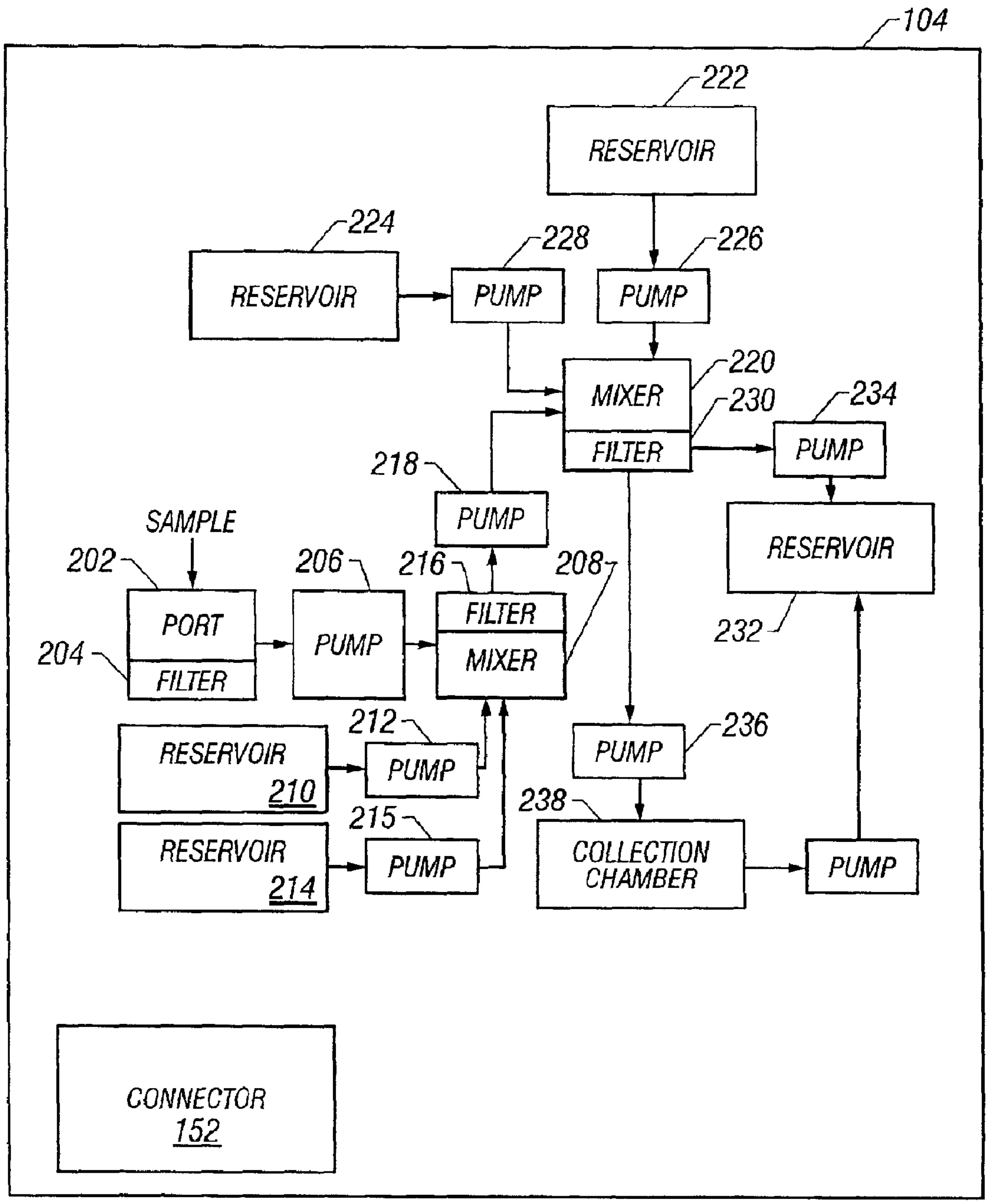
FIG. 2 is a block diagram of components included in an embodiment of a microfluidic system for the bio-sensor in accordance with the present invention.

Referring now to FIG. 2, an embodiment of microfluidic system 104 is shown including a plurality of pumps, valves, filters, mixers, reservoirs, and channels as described below. Connector 152 is also shown in microfluidic system 104, however the connections between the connector 152 and other components on microfluidic system 104 are not shown for simplicity. The connections between connector 152 and the other components are used to communicate signals such as drive signals and detection signals.

Note that the components shown and their placement with respect to one another in FIG. 2 depends on the particular processes to be performed using biosensor device 102. Notably, the number of components and their position with respect to one another, can vary from the configuration shown in FIG. 2. Other types of components can be included in addition to those shown in FIG. 2. Microfluidic system 104 can be configured with enough components to perform one or more protocols concurrently, or at different times with respect to one another. Further, some applications may not require the use of all the components in a given configuration. For example, a particular configuration of microfluidic system 104 can be used for more than one type of process. In this situation, one or more of the reservoirs may be used in some of the processes, but not in others due to different steps being required to prepare and process the sample. Additionally, the components, operate independently of one another, and can be controlled by an external or an embedded control system.

Components can be included in microfluidic systems 104 to perform processes to detect genes, toxins, viruses, bacteria, and vegetative cells. Microfluidic system 104 is intended to include most, if not all, of the components required to perform the process from start to finish, and thus minimal user handling of the sample and intervention is required. Microfluidic system 104 is also designed to be low-cost and hence disposable. These features advantageously lower the risk of contaminating the sample during testing. Further, microfluidic system 104 yields highly reproducible results while requiring a relatively small sample size. For example, a 2.25 square inch disposable microfluidic system 104 can accommodate a sample volume of 500–1000 microliters (before concentration) and a concentrated sample volume of 10 microliters.

In some situations, a sample can contain a low concentration of molecules to be detected. In some embodiments, the dimensions of microfluidic system 104 can range from one to two inches in length and height, and be less than one millimeter in thickness. Due to the small size of microfluidic system 104, the sample may need to be filtered and concentrated prior to performing the extraction and detection processes.

Referring to FIG. 2, a sample containing varying amounts of targets, i.e., cells, virions, or toxins, can be loaded in sample entry port 202 and subjected to a respective sample preparation procedure, such as concentration. This is accomplished by inputting the sample into filter 204 to remove impurities that are larger in size than the target cells, viruses, or concentrates in the sample.

Figure 2A:
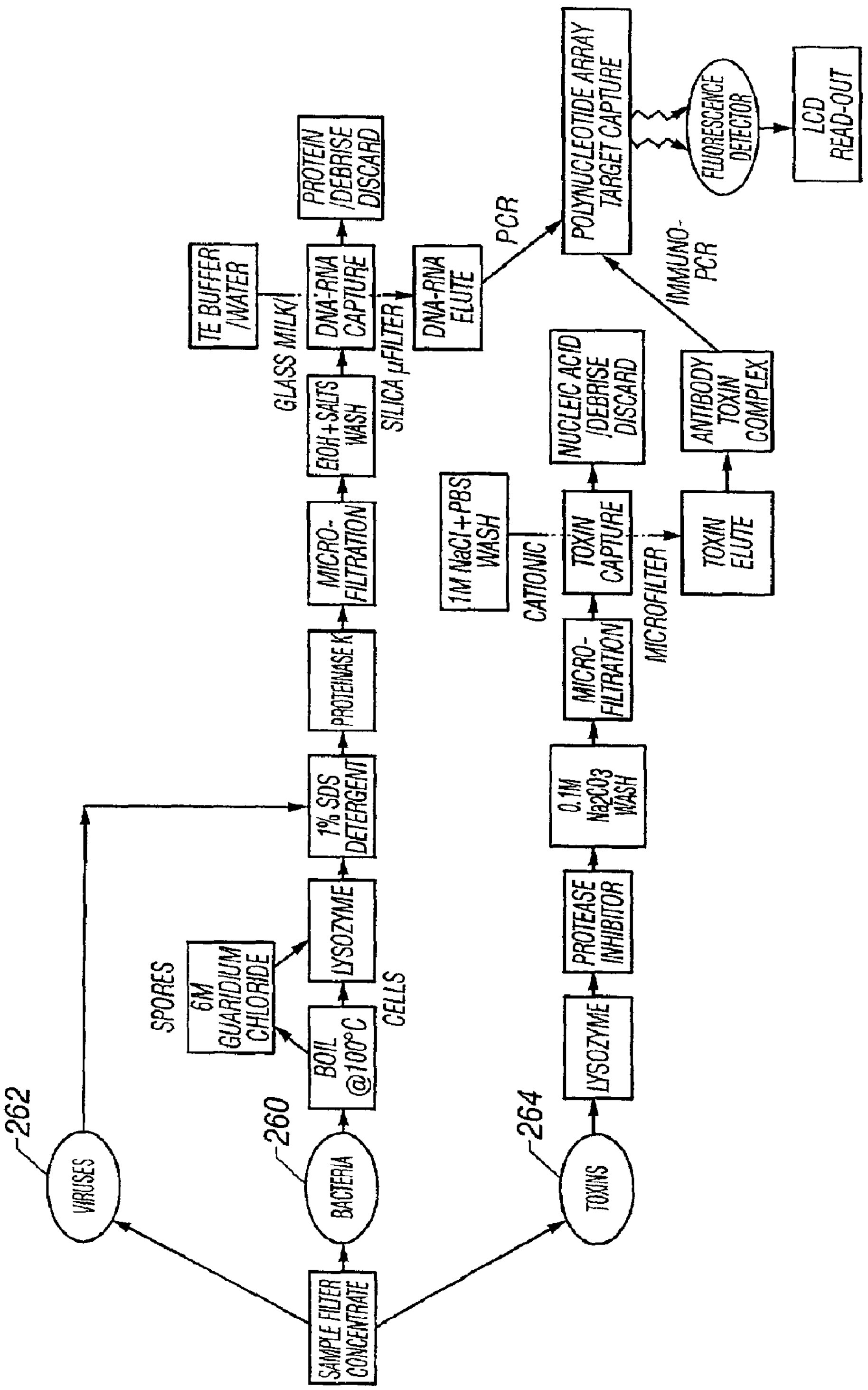
FIG. 2*a* is a flowchart of protocols for detecting viruses, bacteria, and toxins using a biosensor system in accordance with the present invention.

FIG. 2*a* shows a flowchart of examples of protocols that may be implemented on microfluidic system 204 (FIG. 2), including bacteria protocol 260 for isolating and purifying DNA from bacterial cells, virus protocol 262 for isolating and purifying RNA from animal viruses, and toxin protocol 264 for isolating and purifying toxins. Protocols 260, 262, and 264 are representative of the types of assays that can be performed on an appropriately configured microfluidic system 104.

Referring to FIGS. 2 and 2*a*, once the sample is introduced to microfluidic system 104, DNA/RNA purification that is used in protocols 260 and 262 can be achieved as described in the following steps:

1. The sample is transferred to chamber 208 by actuating pump 206, which can be a push button pump or an electronically actuated pump.

2. The sample is mixed/resuspended in lysozyme solution from reservoir 210, which is transferred to mixer 208 via actuation of pump 212.

3. A chamber in mixer 208 is heated to 95 degrees centigrade for a period of time, for example, 2 minutes.

4. Protease (e.g. Proteinase K) in reservoir 214 is pumped into mixer 208 via pump 215.

5. The lysed sample is pumped through microfilter 216 into mixer 220 via pump 218. In one implementation, microfilter 216 is a one to two micrometer filter. In other implementations, the size of microfilter 216 is selected based on the size of the target molecule.

6. A DNA wash solution (for example, Ethanol and salts buffer) is transferred from reservoir 224 to mixer 220 via pump 228.

7. The sample+DNA wash solution from mixer 220 is pumped to the wash discard reservoir 232 via pump 234 through a microfilter 230 or a nucleic acid binding agent such as glass milk.

8. Steps 6 and 7 can be repeated to concentrate DNA/RNA at the microfilter 230 or nucleic acid binding agent, and to discard proteins as well as other contaminants.

9. Aqueous solution from reservoir 222 is pumped in the reverse direction through the microfilter 230 to the DNA/RNA collection chamber 238 for PCR. At this point, the DNA/RNA is dissolved in the aqueous solution and is no longer bound to microfilter 230. Collection chamber 238 can either contain magnetic micro-beads or a polynucleotide array with assay-specific primers.

For toxins or antigens (protein) protocol 264 includes the following processes:

1. The sample is transferred to mixer 208 by actuating pump 206, which can be a push button pump or an electronically actuated pump.

3. The toxin sample is mixed/resuspended in lysozyme solution from a reservoir such as 210, which is transferred to chamber 208 via actuation of pump 212.

4. Protease inhibitor from a reservoir such as 214 is pumped into the lysis chamber 208 via pump 215.

5. The sample is pumped through microfilter 216 into mixer 220 via pump 218.

6. A basic pH wash solution (for example, 0.1M $Na_2CO_3$ buffer, pH=9.0) is transferred from reservoir 224 to mixer 220 via pump 228.

7. The sample+wash solution from mixer 220 is pumped to the wash discard reservoir 232 via pump 234 through a cationic microfilter 230 or a protein binding agent such as cationic beads.

8. Steps 6 and 7 can be repeated to concentrate the toxin (protein) at the microfilter 230 or protein binding agent, and to discard nucleic acid as well as other contaminants and cell debris.

9. Neutral pH buffer solution (such as PBS pH=7.4 containing 1M NaCl), from reservoir 222 is pumped through the cationic microfilter 230 to the protein collection chamber 238 for immuno-PCR. At this point, the protein is dissolved in the neutral buffer and is no longer bound to the microfilter 230 or the protein binding agent. In the collection chamber the toxin is mixed with the respective antibodies conjugated with specific primers and allowed to bind at 37 degrees centigrade for a period of time, such as 5 minutes. The treated sample is transferred from the chamber 208 to the collection chamber 238 (PCR area) where a target bound to an antibody is captured for PCR-based signal amplification reaction and waste is discarded in reservoir 232. The collection chamber 238 can either contain magnetic microbeads or a polynucleotide array with millions of assay-specific primers anchored to the surface.

In one embodiment, millions of copies of the primers can be anchored on magnetic beads, such as those available from Bangs Laboratories, Inc. in Fishers, Ind. The target can be detected using known conjugating methods, such as streptavidin-biotin capture methods. Additionally, for high throughput amplification, an identical set of primers can also be supplied free in solution along with PCR reagents.

After the target is extracted, purified, and captured in the collection chamber 238, the target is denatured at 95 degrees centigrade, and allowed to anneal (hybridize) at 65° centigrade with the primers anchored to an array or magnetic microbeads. In this step, the two strands of DNA are separated and respective anchored primers, as well as primers free in solution (supplied as reagent), bind to the complimentary target sequences.

Following hybridization, enzyme DNA polymerase, such as Taq DNA polymerase or rTth polymerase provided by, for example, PE Applied Biosystems in Foster City, Calif., elongates or synthesizes new complimentary strands in 5'→3' incorporating labeled, i.e., fluorogenic dNTPs, at 72° C. In subsequent cycles of denaturation, annealing and elongation, newly synthesized strands (amplicons) serve as templates for exponential amplification of the target sequence. 3' extension of the primers anchored to the surface leads to synthesis of fluorophore labeled target sequences covalently bound to the surface. Fluorophore labeling is accomplished by incorporation of fluorophore-dNTPs such as Cy5 dye-dCTP/dUTP. After removing free dNTPs and other reagents by washing, fluorescence is measured by detection system 128 (FIG. 1).

Microfluidic system 104 can be configured and adapted to any of the nucleic acid-based assays, i.e., target amplification and hybridization-based signal amplification methods, as discussed in an article entitled "A Review of Molecular Recognition Technologies for Detection of Biological Threat Agents" by Iqbal, S. S., Michael, M. W., Bruno, J. G., Bronk, B. V., Batt, C. A., Chambers, J. P., Review article (2000). Biosensors and Bioelectronics.

A microfilter that is suitable for use as filter 204 can be fabricated by etching pillars that are spaced as closely as 1 micrometer apart in the substrate that is used as the base for microfluidic system 104. One or more of a variety of suitable materials can be used for the substrate, such as silicon and/or plastic. The pillars can be created by etching a material such as silicon, or by other processes that depend on the material being used, such as injection molding with plastic materials. The filter pillars can be fabricated along with the pump chambers, valves, and mixers. To create filters with smaller pore sizes, the pillars can be coated with a suitable material. For example, silicon pillars can be coated with a conformal material such as low-pressure-chemical-vapor-deposition (LPCVD) polysilicon, which is a standard material that is well-known in microfabrication art.

Figure 3A:
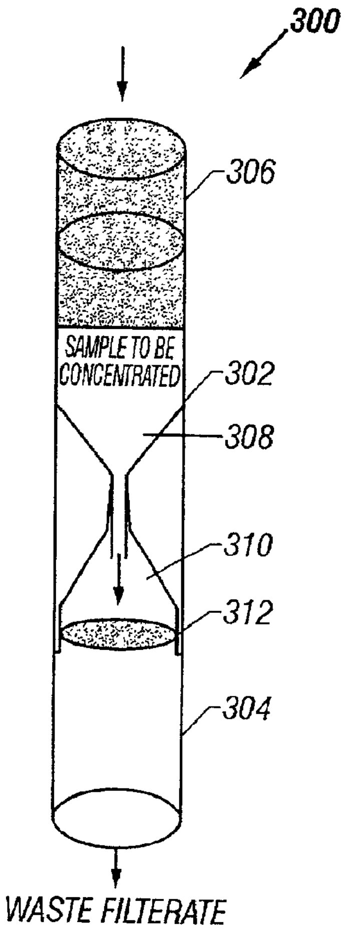
FIG. 3*a* is a side of view of a filtration/concentration assembly in accordance with the present invention.

FIG. 3*a* shows filtration/concentration assembly 300 than can be used instead of, or in addition to, filter 204. Assembly 300 includes a loading chamber 302, a receiving chamber 304, and a plunger 306. Loading chamber includes a funnel portion 308 that mates with another funnel portion 310 on receiving chamber 304 as shown in FIG. 3*a*. Once loading chamber 302 and receiving chamber 304 are mated, the sample to be concentrated and filtered is introduced in loading chamber 302. Plunger 306 can be inserted in receiving chamber 304 and pushed downward to force the sample through filter 312.

Filter 312 is an appropriately sized microfilter, depending on the size of the molecule to be detected. A molecular weight cut off filter or a negatively charged fiber glass filter such as those commercially available from Memtec Limited, Timonium, Md., can be used.

As the sample is pushed through filter 312, the analytes of interest are retained and concentrated on filter 312 while the excess solution passes through filter 312. Receiving chamber 304 is open at the end to allow the excess solution to flow out.

Figure 3B:
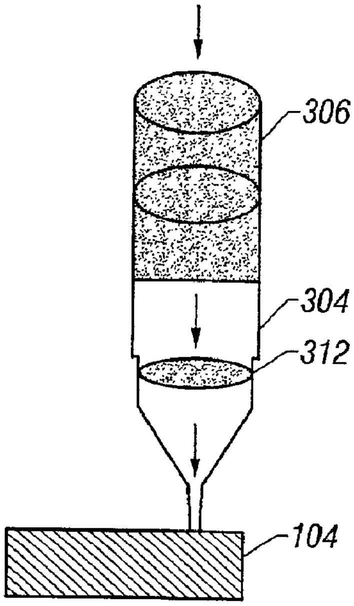
FIG. 3*b* is a side of view of a portion of the filtration/concentration assembly that is used to introduce a sample to a microfluidic system in accordance with the present invention.

Once the runoff of the excess solution is completed, assembly 300 is disassembled, receiving chamber 304 is inverted and a volume of assay reagent is loaded in receiving chamber 304. The volume of assay reagent can be as low as 5 to 25 microliters, depending on the size of port 202 in the microfluidic system 104. Plunger 306 is inserted in the top of receiving chamber 304, and funnel portion 310 is inserted in port 202 (FIG. 2) in microfluidic system 104, as shown in FIG. 3*b*. Plunger 306 is pushed downward to force the assay reagent though filter 312. Analytes previously concentrated on filter 312 are dissolved in the assay reagent and transferred into microfluidic system 104 through port 202.

Any suitable, commercially available thermal cycling device, such as a thermo-electric cooler (TEC) 112 (FIG. 1) can be used to heat and cool the sample as described in the steps above. Size and power output of the TEC depends on the application. OptoTEC and ThermaTEC series TEC's by MELCOR Corporation in New Jersey are suitable for use in such in systems. Alternatively, resistive heaters microfabricated on the microfluidic system 104 can be used for heating while the TEC 124 can be used for cooling.

TEC 124 is positioned on or near microfluidic system 104 (FIG. 1) in close enough proximity to the chambers to effectively heat or cool the fluid(s). A silver-filled heat resistant adhesive with high thermal conductivity can be used to attach TEC 124 to promote heat transfer. Alternatively, TEC 124 can be included in biosensor device 102 such that it is aligned and spring-loaded to rest in a position to heat or cool the contents of the desired chambers microfluidic system 104 when it is inserted into biosensor device 102.

Temperature feedback for closed-loop control is provided by a thermocouple which is co-located with the TEC 124. Thermocouples are a commercially available from numerous companies, for example, Newark Electronics Corporation in Chicago, Ill. and WakeField Engineering, Inc. in Beverly, Mass. Temperature feedback can also be provided by microfabricated temperature sensors that are built in to microfluidic system 104.

In one embodiment, microfluidic system 104 has a planar design, i.e., all components can be fabricated in one step, which eliminates the need for stacking multiple layers and simplifies fabrication. Reservoirs can be sized according to the amount of substance to be stored in them. Reservoirs, mixers, and pumps can include access holes for loading sample(s) and reagents. The sample(s) and reagents can be introduced using a syringe and the holes can be sealed by laminating a film of a hydrophobic porous material, such as GORE-TEX® by W. L. Gore and Associates, Inc., which will act as a vent for trapped gases.

A variety of materials and fabrication techniques can be used for monolithic fabrication of the pumps and other components of the planar system. In one embodiment, the system can etched out in a silicon substrate using a deep anisotropic silicon etching process known as ICP Multiplex System by Surface Technology Systems in the United Kingdom. A flexible glass cover can then be bonded to cover the channels and also form the diaphragm for the pumps. The flexible cover can also include electrical interconnects for various components in the substrate, and can be transparent to allow optical detection or viewing under a microscope.

In another embodiment, the system can be embossed into a polymer substrate using an embossing tool manufactured by companies such as Jenoptik Microtechnic GmBH in Germany. In this case, a mold or negative replica of the system is first etched into silicon to form an embossing tool. The tool is then embossed into the polymer substrate at an appropriate softening temperature and then retracted. The tool can be re-used to create more replicas reducing the cost per piece. Access holes can be drilled into the embossed polymer substrate. Another thin sheet of polymer can be chemically bonded to cover the channels.

Figure 3C:
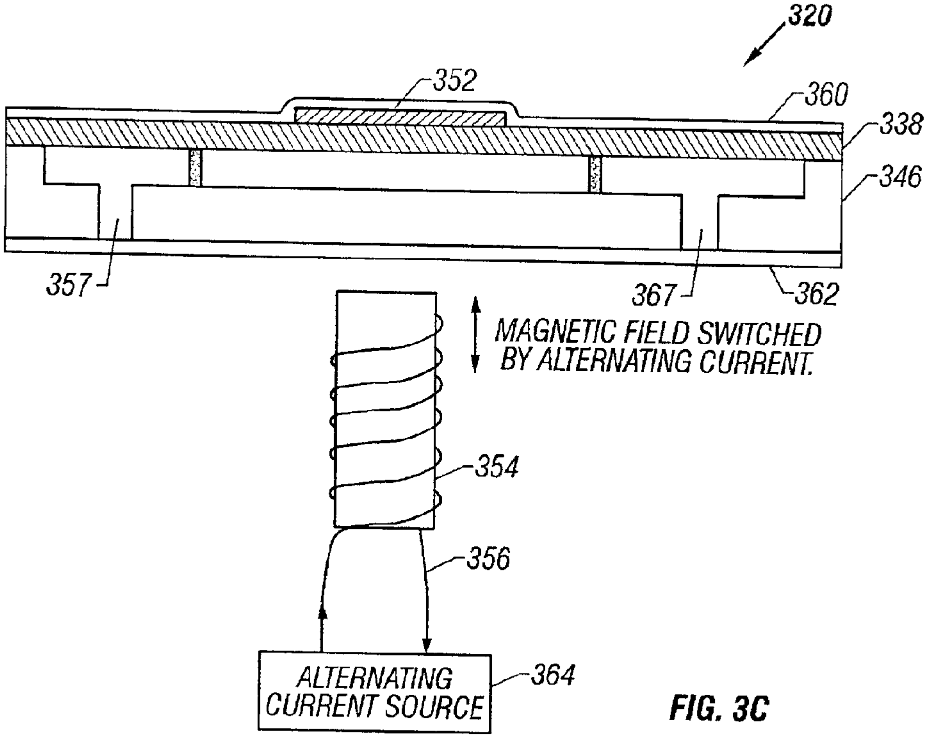
FIG. 3*c* is a side of view of the electro-magnetically actuated pump in accordance with the present invention.
Figure 3D:
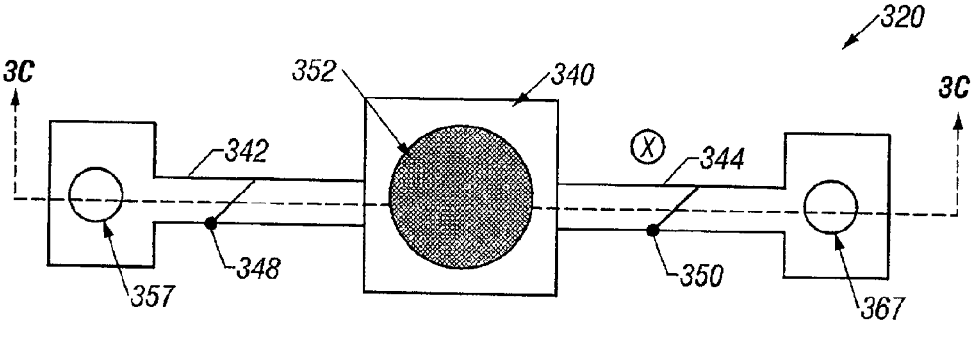
FIG. 3*d* is a top view of the electro-magnetically actuated pump and check valve in accordance with the present invention.

FIGS. 3*c* and 3*d* show a cross-sectional side view and a top view, respectively, of a pump 320 that is suitable for use in microfluidic system 104 (FIG. 1). Pump 320 includes diaphragm 338 that causes alternating volumetric changes in a pump chamber 340 when deflected. When pump chamber 340 contains liquids or gases, they are transferred by the pumping action into another chamber or reservoir (not shown) via channels 342, 344 in substrate 346. Check valves 348, 350 are located in channels 342, 344, respectively, to control the flow of fluid into and out of chamber 340. The diaphragm 338 is actuated electro-magnetically with magnetic member 352 being controlled by magnetic core 354 and alternating current in solenoid 356.

Techniques known in the art, such as silicon etching, plastic injection molding, and hot embossing can also be used to fabricate microfluidic system 104. A combination of fabrication methods well-known in the art can be used to fabricate flow channels 342, 344, pump chamber 340, and check valves 348, 350 in substrate 346.

In one embodiment, the top side of microfluidic system 104 includes channels 342, 344, and pump chamber 340. The top and bottom sides can include access holes 357, 367 for loading reagents and other substances into chamber 340, as required. The sample(s) and reagents can be introduced using a syringe and then access holes 357, 367 are sealed by chemically bonding layers 360, 362 to the top and/or bottom sides, respective.

Microfluidic system 104 can also be fabricated out of one or more layers of molded or embossed polymers. In one embodiment, channels, reservoirs, pump chambers, and check valves are embossed in substrate 346. A flexible layer is chemically bonded to the top of substrate 346, to form diaphragm 338 and seal the channels, reservoirs, and access holes on the top side. Magnetic members 352 for pumps 320 are positioned on top of the second layer. A top protective layer 360 and/or a bottom protective layer 362 can be included to seal and protect the top and bottom of substrate 346, as shown in FIG. 3*c*. The top protective layer 360 is flexible to allow movement of diaphragm 352 during actuation.

Diaphragm 338 is attached to the top of substrate 346 and is made out of a thin sheet of flexible material such as plastic, glass, silicon, elastomer, or any other suitable, flexible material. The flexibility or stiffness required of diaphragm 338 depends on the desired deflection of the diaphragm. Typically the stiffness is selected to achieve a total upward and downward deflection of approximately five to fifteen microns. Any suitable attachment mechanism, such as chemical bonding, can be used to attach diaphragm 338 to substrate 346. The bonding technique utilized should be capable of maintaining the seal while the pump 320 is operating.

Magnetic member 352 is made out of magnetic material which is attracted and repelled by a magnetic force from magnetic core 354. Magnetic member 352 can be adhesively bonded to diaphragm 338, or electroplated onto the diaphragm 338 during manufacturing. Substrate 346 can be made of plastic, silicon, or other suitable material that is capable of substantially retaining the shape of pump chamber 340 during operation.

An electrically conductive wire is coiled around magnetic core 354 to form solenoid 356. When an electric current passes through solenoid 356, a magnetic field is created in magnetic core 354. The polarity of the current can be alternated to change the direction of force of the magnetic field, thus alternately repelling and attracting magnetic member 352. The repelling and attracting forces cause diaphragm 338 to move, changing the volume of chamber 340. An increase in volume draws fluid or gas into chamber 340 via channel 342, and a decrease in volume forces the fluid or gas into channel 344. Applying a periodic excitation voltage to solenoid 356, such as provided by current source 364, causes diaphragm 338 to oscillate, producing a pumping action. The flow rate is thus directly controlled by the frequency of the alternating current to solenoid 356.

Note that the current through solenoid 356 can have a positive or negative sign that produces a magnetic field in magnetic core 354. One end of the magnetic core 354 becomes positively charged, and the other end becomes negatively charged. When the sign of the current through solenoid 356 is reversed, the charge at the ends of magnetic core 354 also reverse. When the current is shut off, magnetic core 354 loses its magnetism. Further, magnetic member 352 has a positively charged end, and a negatively charged end. Magnetic member 352 is attracted to magnetic core 354 when the ends closest to each other are oppositely charged. Similarly, magnetic member 352 is repelled by magnetic core 354 when the ends closest to each other have the same charge. The strength of the attraction or repulsion depends on the number of windings in solenoid 356, and the strength of the electric current.

Check valve 348 controls the inflow of fluid or gas into chamber 340, and check valve 350 controls flow out of chamber 340. Check valve 348 allows fluid to flow into chamber 340 when the volume of chamber 340 is increased, and prevents backflow of the fluid or gas when the volume of chamber 340 is decreased. Flow through channel 344 is controlled by check valve 350, which allows flow into channel 344 when the volume of chamber 340 is decreased, and prevents backflow from channel 344 when the volume of chamber 340 is increased.

Pump 337 is well-suited for use with a variety of devices, in addition to microfluidic system 104, because the components associated with actuating pump 337, namely, magnetic member 352, magnetic core 354, and coil 356, can be fabricated to a wide range of dimensions, including microscale dimensions. Flow rates can be adjusted by varying the frequency and amplitude of the alternating current through solenoid 356. Additionally, an electronic, microprocessor-based control system 366, as known in the art and shown in FIG. 3*e*, can be implemented to receive sensor input from flow sensors 368 that measure the flow into and/or out of pump 337. For example, a Digital Signal Processor such as model number ADSP-2181 by Analog Devices, Inc. of Norwood, Mass., can be used as the controller. Logic associated with control system 366 compares the actual flow rate to the desired flow rate, and provides a drive signal to current source 364 to adjust the frequency and amplitude of the current source 364 accordingly to achieve the desired flow rate from pump 337.

Referring again to FIGS. 3*c* and 3*d*, magnetic member 352 is located on diaphragm 338. Magnetic core 354 is positioned close enough for its magnetic field to actuate diaphragm 338. Magnetic core 354 with solenoid 356 can be positioned above magnetic member 352 or below chamber 340, depending on the strength of the magnetic field developed by the magnetic core. Instead of a single electromagnet, two magnets placed on opposite sides of the magnetic member 352 can also be used in a push-pull configuration to maximize deflection. Further, magnetic core 354, solenoid 356, and current source 364 can be built into a structure surrounding substrate 346, diaphragm 338, and magnetic member 352.

Other types of devices for creating magnetic fields for actuating the magnetic member 352 can also be utilized with the present invention, instead of, or in addition to an electromagnet. For example, permanent magnets with opposing charges can be mounted on a structure that moves toward and away from the magnetic member 352 at a periodic, variable rate, thereby actuating diaphragm 338. The magnet having a like charge to the magnetic member 352 would be used to repel the magnetic member 352, while the magnet having the opposite charge would be used to attract the magnetic member 352. Other alternatives known in the art for attracting and repelling a magnetic member 352 can also be utilized.

Various types of check valves are suitable for use with the pump 320 to control the flow of fluid, gas, or other substance in the desired direction. In one embodiment, as shown in FIG. 3*d*, check valves 348 and 350 are passive flaps etched or molded in the substrate 346. As shown in FIG. 3*d*, check valves 348, 350 are a substantially straight flap having a length that is longer than the width of channels 342, 344. The flap is angularly positioned across the width of the channel, with the end that is closer to the start of the flow being anchored to a sidewall of the channels 342, 344, while the other end of the flap is free-floating. This type of construction can be achieved by cutting or etching around the substrate material to leave it attached to one sidewall, while cutting or etching through the material to free it from the other sidewall. If an injection molding process is used, the mold is continuous between the sidewall and the flap to leave it attached to the sidewall, while a space is left between the other end of the flap and the sidewall.

The force of a substance, such as a fluid or gas, being pumped through channels 342, 344 tries to align the flap with the direction of the flow. The substance passes through channel 342 as the free-floating end of the flap moves away from the sidewall with the direction of the flow caused by the vacuum that is created when diaphragm 338 is raised. The vacuum created by upward movement of diaphragm 338 also forces the free end of check valve 350 into the sidewall of channel 344, thereby preventing backflow from channel 344. The reverse happens when the diaphragm moves downward and the fluid is propelled in one direction.

It is anticipated that some embodiments of biosensor device 102 would include one or more bi-directional valves. Further, the operation of both unidirectional and bi-directional valves could be controlled by the force of the flow created by actuating diaphragm 338, or electronically using logic in valve controller 164 (FIG. 1*a*) to open and close valves 348, 350, in FIG. 3*d*.

It is important to note that one or more channels, such as channel 342 in FIG. 3*d*, can feed into pump chamber 340. Likewise, one or more channels, such as channel 344, can be used to transport a substance out of pump chamber 340.

Figure 3E:
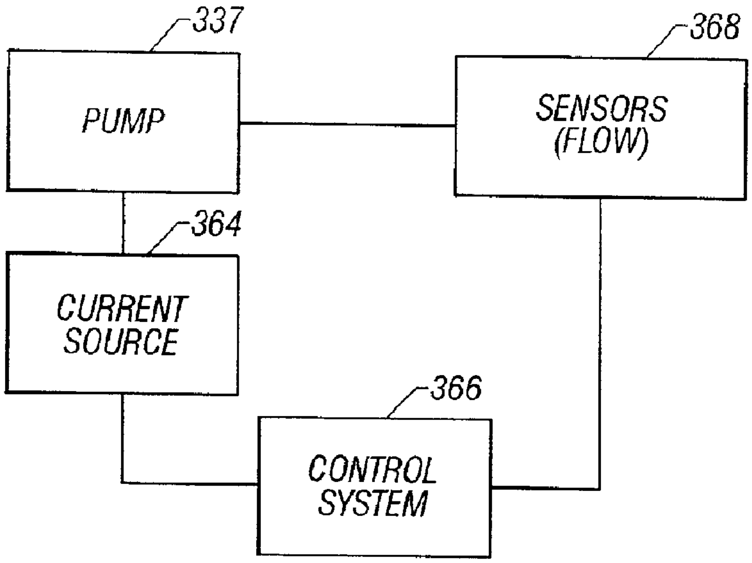
FIG. 3*e* is a block diagram of a microfluidic pump coupled to a feedback and control system in accordance with the present invention.
Figure 3F:
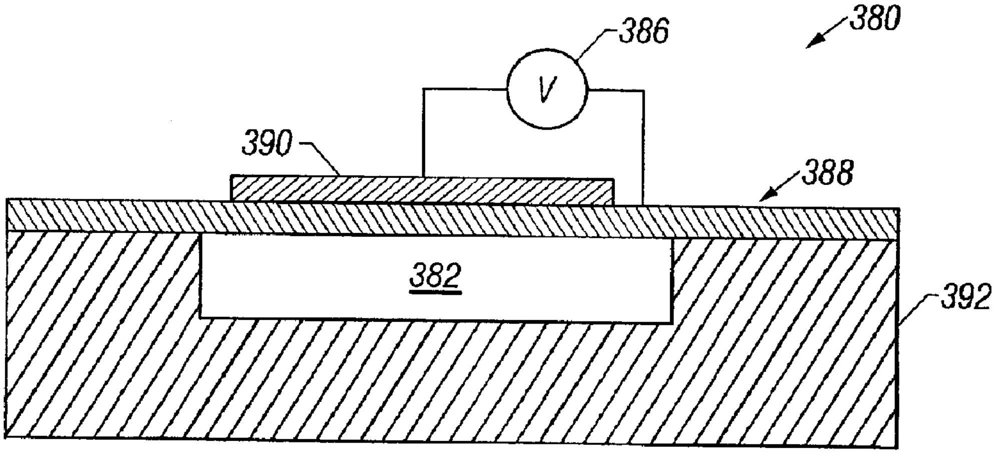
FIG. 3*f* is a block diagram of a piezoelectric pump coupled to a feedback and control system in accordance with the present invention.

FIG. 3*f* shows a diagram of a typical piezoelectric micropump 380 found in the art that is suitable for use with the present invention in addition to, or instead of, pump 320 (FIG. 3*e*). Pump 380 includes a pump chamber 382 which is capped by heat-resistant glass layer 388 which also forms the diaphragm. Piezoelectric element 390 is bonded to diaphragm 388. Applying a voltage from voltage source 386 to the piezoelectric element 390 induces either an upward or downward deflection depending upon the polarity of the applied voltage. This changes the volume of the pump chamber 382, causing it to draw fluid through an inlet valve, and to pump fluid through an outlet valve, on opposite strokes of the cycle. Applying a periodic excitation voltage causes diaphragm 388 to oscillate, producing a pumping action. The flow rate is thus directly controlled by the frequency of the electrical drive signal to the piezoelectric element 390.

Substrate 392 can be fabricated from polymer or silicon material. The glass layer 384 is bonded onto substrate 392 using a suitable bonding method, such as anodic or epoxy bonding, to prevent leakage. Polyimides and thermal laminants can also be used for bonding and have the advantage of a lower bonding temperature.

Figure 3G:
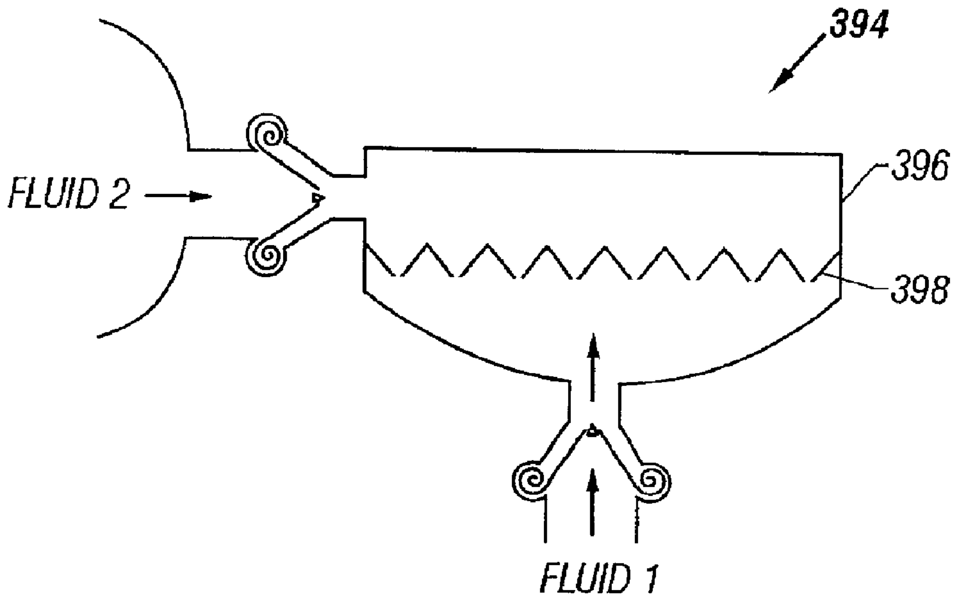
FIG. 3*g* is a diagram of a mixer in accordance with the present invention.

One way to mix very small amounts of two or more substances in microfluidic system 104 is to feed the flow streams into one channel as they are directed to a reservoir or pump chamber. An alternative way includes injecting one substance into another using micro-nozzles. Referring now to FIG. 3*g*, one embodiment of mixer 394 with micro-nozzles is shown that is suitable for use with the present invention microfluidic system 104. Mixer 394 includes a mixing chamber 396 with nozzles 398 on one side. During operation, the mixing chamber 396 is filled with one or more substances, and another substance is injected through the nozzles 398, thereby generating a plurality of micro-plumes. The plumes effectively mix the substances without requiring any additional processing. Mixing time depends on injection flow rate, size of nozzles, distance between each nozzle and size of the mixing chamber. Nozzles with orifices as small as one (1) micrometer can be provided using known fabrication processes.

Figure 4:
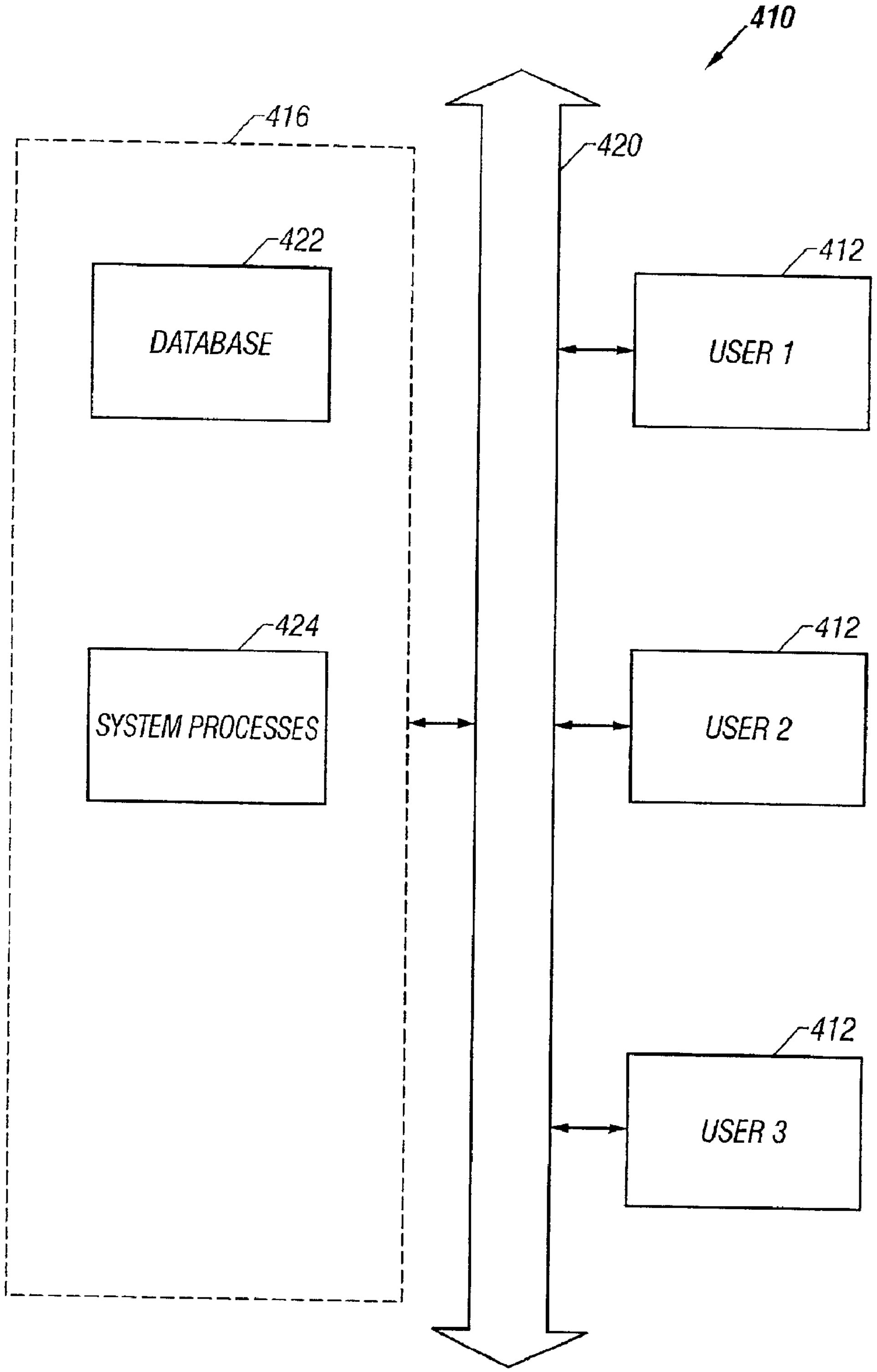
FIG. 4 is a diagram of an information network in accordance with the present invention.

Information from biosensor device 102 can be accessed by authorized users when biosensor device 102 is connected to an information network. One embodiment of components and connections between components in information network 410 that can be used with the present invention is shown in FIG. 4. Users access information and interface with information network 410 through workstations 412. Workstations 412 execute application programs for presenting information from, and entering data and selections as input to interface with information network 410. Workstations 412 also execute one or more application programs to establish a connection with server 416 through network 420. Various communication links can be utilized, such as a dial-up wired connection with a modem, a direct link such as a T1, ISDN, or cable line, a wireless connection through a cellular or satellite network, or a local data transport system such as Ethernet or token ring over a local area network. Accordingly, network 420 includes networking equipment that is suitable to support the communication link being utilized.

Those skilled in the art will appreciate that workstations 412 can be one of a variety of stationary and/or portable devices that are capable of receiving input from a user and transmitting data to the user. The devices can include visual display, audio output, tactile input capability, and/or audio input/output capability. Such devices can include, for example, biosensor system 100, desktop, notebook, laptop, and palmtop devices, television set-top boxes and interactive or web-enabled televisions, telephones, and other stationary or portable devices that include information processing, storage, and networking components. Additionally, each workstation 412 can be one of many workstations connected to information network 410 as well as to other types of networks such as a local area network (LAN), a wide area network (WAN), or other information network.

Server 416 is implemented on one or more computer systems, as are known in the art and commercially available. Such computer systems can provide load balancing, task management, and backup capacity in the event of failure of one or more computer systems in server 416, to improve the availability of server 416. Server 416 can also be implemented on a distributed network of storage and processor units, as known in the art, wherein the modules and databases associated with the present invention reside on workstations 412, thereby eliminating the need for server 416.

Server 416 includes database 422 and system processes 424. Database 422 can reside within server 416, or it can reside on another server system that is accessible to server 416. Database 422 contains information regarding users as well as results from tests performed using biosensor device 102. Consequently, to protect the confidentiality of such information, a security system can be implemented that prevents unauthorized users from gaining access to database 422. Users can be authorized to transmit and/or receive information from database 422. User interface 114 (FIG. 1) can allow the user to download and/or retrieve results from one or more tests to database 422.

System processes 424 include program instructions for performing analysis of data from biosensor device 102 and other information provided by the user. The type of analysis performed is based on the type of data being analyzed, and the type of information to be provided to the user.

One application of biosensor system 100 is generating and sharing information for medical diagnosis. A user can introduce a sample to be analyzed, such as a drop of blood or other bodily fluid, into microfluidic system 104. As discussed above, a variety of different configurations can be implemented on microfluidic system 104, depending on the specific test to be performed. Accordingly, microfluidic system 104 includes the components, and the type and amount of reagents required to perform one or more assays on the sample.

Biosensor system 100 can screen for known pathogens for infectious diseases and/or markers for genetic disorders. After the sample is analyzed, the presence of a pathogen or a disease marker (gene/protein) above a specific level can be indicated. Data from each assay can be transmitted to server 416 directly from biosensor system 100 or via workstation 412. The data is stored in server 416 using a personal, secured account that is generated for each user. A subscriber, such as a physician and/or other authorized individual, can be granted remote access to the user's account via information network 420.

The foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the spirit and scope of the invention as set forth in the following claims.

What is claimed is:

1. A biosensor system for processing a sample and detecting one or more target substances in the sample, comprising:

a data processing and control unit;

a microfluidic system couplable to communicate with the data processing and control unit, wherein the microfluidic system includes microfabricated components;

a detection system coupled to receive a processed sample from the microfluidic system and transmit signals regarding the target substances to the data processing and control unit; and a handheld housing including the data processing and control unit, and the detection system, wherein the data processing and control unit and the detection system are permanently fixed in the housing, and the microfluidic system is insertable and removable from the housing.

2. The system as set forth in claim 1, further comprising a user interface coupled to receive input from a user and provide output to the user, the user interface being further coupled to provide the input from the user to the data processing and control unit.

3. The system as set forth in claim 2, wherein the output to the user includes information regarding the target substances.

4. The system as set forth in claim 2, wherein the input from the user includes information regarding the processing to be performed on the sample.

5. The system as set forth in claim 1, wherein the data processing and control unit processes information from the detection system.

6. The system as set forth in claim 1, wherein the data processing and control unit includes one or more driver units coupled to control operation of the components in the microfluidic system.

7. The system as set forth in claim 1, wherein the data processing and control unit includes one or more driver units coupled to control operation of the detection system.

8. The system as set forth in claim 1, further comprising a thermo-electric cooler for heating and cooling the sample during processing.

9. The system as set forth in claim 1, wherein the microfabricated components include one or more pumps.

10. The system as set forth in claim 9, wherein at least one of the pumps is electro-magnetically actuated.

11. The system as set forth in claim 9, wherein at least one of the pumps is piezoelectrically actuated.

12. The system as set forth in claim 1, wherein the microfabricated components include one or more mixers.

13. The system as set forth in claim 12, wherein the one or more mixers include a nozzle for injecting a first substance into a chamber containing the sample.

14. The system as set forth in claim 1, wherein the microfabricated components include one or more filters.

15. The system as set forth in claim 1, wherein the microfabricated components include one or more valves.

16. The system as set forth in claim 1, wherein the microfabricated components include one or more flow sensors.

17. The system as set forth in claim 1, further comprising an insert detector configured to detect coupling of the microfluidic system to communicate with the data comprising and control unit.

18. The system as set forth in claim 8, further comprising a loading lever operable to place the thermo-electric cooler in contact with the microfluidic system.

19. The system as set forth in claim 16, further comprising a control system operable to compare an actual flow rate to a desired flow rate in the microfluidic system, and to adjust operation of a pump to achieve the desired flow rate.

20. The system as set forth in claim 15, wherein at least one of the valves is formed as a movable flap in a channel in the microfluidic system, one end of the flap being fixed to one side wall of the channel, and another end of the flap being movable between an open position and a closed position.

21. The system as set forth in claim 20, wherein the flap is angularly positioned across the width of the channel, with the end that is closer to the start of the flow being anchored to the one sidewall of the channel.

22. The system as set forth in claim 20, further comprising a first flap positioned in an inlet channel to a chamber, and a second flap position in an outlet channel from the chamber, wherein a vacuum created by movement of a diaphragm pump in one direction over the chamber forces the free end of the second flap into the sidewall of the outlet channel, thereby preventing backflow from the outlet channel into the chamber, and further wherein a vacuum created by movement of the diaphragm pump in another direction over the chamber forces the free end of the first flap into the sidewall of the inlet channel, thereby preventing flow from the inlet channel into the chamber as a substance in the chamber is expelled from the chamber through the outlet channel.

23. The system as set forth in claim 1, wherein the data processing and control unit is configured to communicate with an information network, and data from the data processing and control unit can be accessed from a remote workstation coupled to the network.

24. The system as set forth in claim 17, wherein a signal from the insert detector is used to start operating other components in the system.

25. The system as set forth in claim 1, wherein the detection system is operable to detect electrical signals from a processed sample.

26. The system as set forth in claim 1, wherein the detection system is operable to detect fluorescence of a processed sample.

* * * * *